US009479681B2

(12) United States Patent
Gaddy et al.

(10) Patent No.: US 9,479,681 B2
(45) Date of Patent: Oct. 25, 2016

(54) SYSTEM AND METHOD FOR SHOT CHANGE DETECTION IN A VIDEO SEQUENCE

(71) Applicant: SPINELLA IP HOLDINGS, INC., Edison, NJ (US)

(72) Inventors: William L. Gaddy, Milford, PA (US); Vidhya Seran, Irving, TX (US)

(73) Assignee: A2ZLOGIX, INC., Edison, NJ (US)

( * ) Notice: Subject to any disclaimer, the term of this patent is extended or adjusted under 35 U.S.C. 154(b) by 807 days.

(21) Appl. No.: 13/856,756

(22) Filed: Apr. 4, 2013

(65) Prior Publication Data

US 2013/0258202 A1     Oct. 3, 2013

Related U.S. Application Data

(63) Continuation of application No. 12/941,593, filed on Nov. 8, 2010, now Pat. No. 8,451,384.

(60) Provisional application No. 61/362,455, filed on Jul. 8, 2010.

(51) Int. Cl.
    *H04N 5/14*     (2006.01)

(52) U.S. Cl.
    CPC ............... *H04N 5/14* (2013.01); *H04N 5/147* (2013.01)

(58) Field of Classification Search
    CPC ................................. H04N 5/147; H04N 5/14
    USPC ....................................................... 348/699
    See application file for complete search history.

(56) References Cited

U.S. PATENT DOCUMENTS

| 5,500,904 | A | * | 3/1996 | Markandey | ........... | G06T 7/2066 |
|---|---|---|---|---|---|---|
| | | | | | | 382/103 |
| 5,732,146 | A | | 3/1998 | Yamada et al. | | |
| 6,195,458 | B1 | | 2/2001 | Warnick et al. | | |
| 6,278,446 | B1 | | 8/2001 | Liou et al. | | |
| 2003/0213892 | A1 | * | 11/2003 | Zhao | ...................... | H01L 27/146 |
| | | | | | | 250/208.1 |
| 2006/0107216 | A1 | | 5/2006 | Cooper et al. | | |
| 2007/0160128 | A1 | * | 7/2007 | Tian | ...................... | H04N 5/147 |
| | | | | | | 375/240 |
| 2008/0112649 | A1 | * | 5/2008 | Chen | .................... | G06K 9/6857 |
| | | | | | | 382/302 |
| 2009/0167958 | A1 | * | 7/2009 | Wredenhagen | ....... | G06T 7/2013 |
| | | | | | | 348/699 |
| 2010/0086176 | A1 | | 4/2010 | Yokono et al. | | |
| 2010/0104158 | A1 | | 4/2010 | Shechtman et al. | | |
| 2010/0124361 | A1 | | 5/2010 | Gaddy | | |
| 2012/0019655 | A1 | * | 1/2012 | Fukamachi | ........... | G06T 7/2006 |
| | | | | | | 348/142 |

FOREIGN PATENT DOCUMENTS

EP          1039757          9/2000

OTHER PUBLICATIONS

Smeaton, "Video Shot Boundary Detection: Seven Years of TRECVid Activity" Computer Vision and Image Understanding 114, (4). (2010) pp. 411-418.
Supplementary European Search Report of EP Application No. EP11804045 dated Jan. 16, 2014, 2 pages.
International Search Report of PCT Application No. PCT/US2011/41400 dated Nov. 8, 2011, 2 pages.

* cited by examiner

*Primary Examiner* — Gims Philippe
*Assistant Examiner* — Richard Carter
(74) *Attorney, Agent, or Firm* — Lowenstein Sandler LLP

(57) ABSTRACT

A computer implemented method for automatically identifying shot changes in a video sequence in real-time or near-real-time is disclosed. Optical flow energy change differences between frames, sum-of-square differences between optical-flow-compensated frames, and hue histogram changes within frames are analyzed and stored in frame buffers. A feature vector formed from a combination of these measurements is compared to a feature vector formed from thresholds based on tunable recall and precision to declare the presence or absence of a shot change.

27 Claims, 17 Drawing Sheets

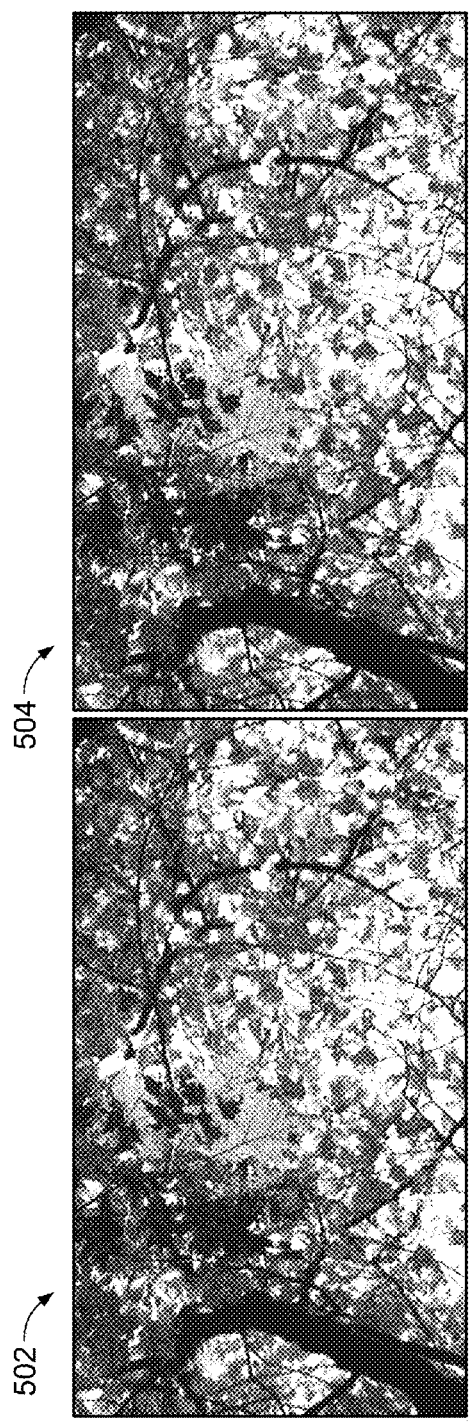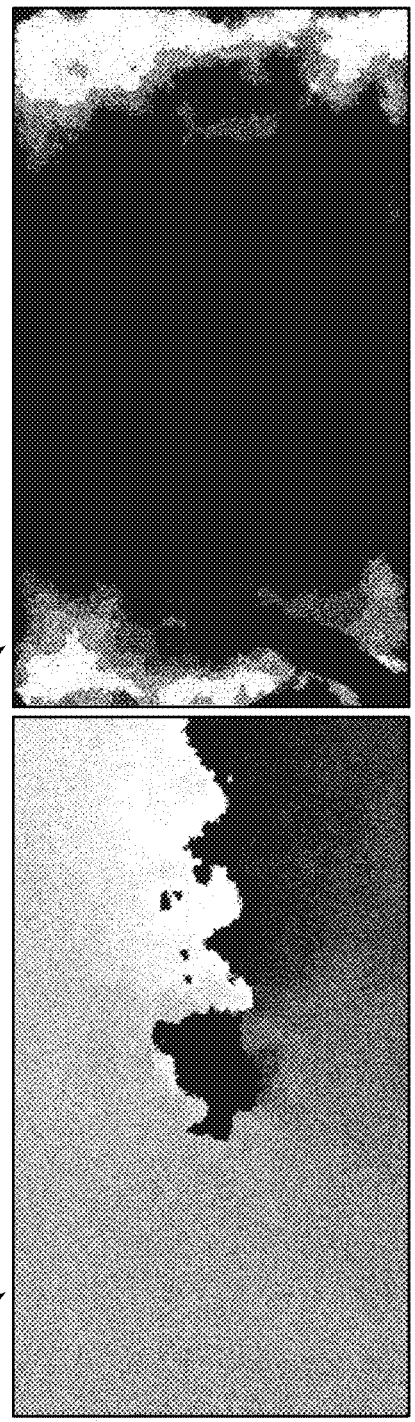
FIG. 5A
FIG. 5B
FIG. 5C
FIG. 5D

SYSTEM AND METHOD FOR SHOT CHANGE DETECTION IN A VIDEO SEQUENCE

CROSS-REFERENCE TO RELATED APPLICATIONS

This application is a continuation of U.S. patent application Ser. No. 12/941,593 filed Nov. 8, 2010, which claims the benefit of U.S. Provisional Patent Application No. 61/362,455 filed Jul. 8, 2010, the disclosures of which are incorporated herein by reference in their entirety.

FIELD OF THE INVENTION

The present invention relates generally to digital image-processing systems, and more particularly, to a method and a digital image-processing system for real-time or near-real-time automatic detection of shot changes in a sequence of images, such as those found within a video frame sequence.

BACKGROUND OF THE INVENTION

Reliable detection and signaling of shot changes within a sequence of images, e.g., a video sequence, is a difficult but well-researched problem in the art. Reliable detection and signaling of shot changes has found many applications in the field of video signal processing, including cadence detection, de-interlacing, format conversion, compression encoding, and video indexing and retrieval. Shot changes are easily identified by a human viewer—such events include changeover from an episodic television program to an advertising spot or camera changes such as when a live news studio broadcast cuts from one camera angle to another on the same set.

Unfortunately, reliable shot change detection by machines has proven elusive due to the lack of a precise definition of what constitutes a machine-detectable "shot change" (temporal) or "shot boundary" (locality). As used herein, a machine-detectable "shot change" may be defined as a positive indication that a given "uninterrupted image sequence captured by a single camera capture" has changed to, or is changing to, another different "uninterrupted image sequence captured by a single camera." Additionally, when there is a smooth transition from one shot to the next, such as during a fade transition, it is assumed that the indication occurs at the end of a shot change transition.

It is desirable to have an effective automated shot change detection method for successful operation of many video processing systems. For example, many motion compensated video de-interlacing systems use some form of automated shot change detection to determine when to reset or zero-out their motion-compensation buffers. It is also used as an automated preprocessing step, with human intervention correcting errors in the automated step, for providing video segmentation boundaries for later work that would otherwise be prohibitively time-consuming to produce without machine assistance. Shot change detection is easily, if slowly, provided by human analysis. It is, in most cases, extremely sensitive to context.

Shot changes take many forms—of primary concern are abrupt shot changes. Other forms of shot changes include fade transitions that may span dozens of video frames, including fade-from-black, fade-to-black, and mixing fade from one shot to another. Another form of shot changes are "wipes", wherein a new shot (i.e., captured image or sequence of images in a video) is introduced as a superimposed overlay (or partial mix) of the new and an old shot, with a transition taking place over a number of frames. An example is a right-to-left wipe where the new shot is introduced incrementally from right-to-left over the course of half of a second, e.g., over 15 video frames.

The performance of a shot change detection method is determined primarily by the requirements of the system and application(s) employing the system. These requirements are most succinctly expressed by a combination of precision and recall. As used herein "precision" refers to an indication of a false positive ratio (values approaching 100 percent refer to fewer erroneously positive shot change indications), while "recall" refers to an indication of a false negative ratio (values approaching 100 percent refer to fewer missed shot changes).

No prior art shot change detection method and system has approached 100% precision and recall, including state-of-the-art academic research computer-vision study systems requiring vast computational resources for offline evaluation. However, some systems utilizing shot change detection may be more sensitive to false positives than false negatives, or vice versa. An example is a motion-compensated de-interlacing system. An overabundance of false positives may result in the de-interlacing system reverting to spatial methods instead of temporal methods, which may reduce effective resolution of output temporarily for the duration of a shot change. An overabundance of false negatives may lead to bad motion compensation, resulting in very visible visual artifacts and discontinuities that most viewers would find objectionable. In such circumstances, the best trade-off would be for the shot change detection system to be highly sensitive and prone to false positives, rather than failing to report marginal indications of shot changes that may result in visible artifacts.

An example of a condition in which false positives is undesirable is when a system that utilizes shot change detection to modulate motion estimation contribution to a single-camera depth map extraction statistical model. In such circumstances, the motion estimation may only contribute a small part of the overall model, but an overabundance of false-positive shot change indications introduce severe model instabilities, resulting in rapid temporal changes to the depth model. This, in turn, results in visible modulations of depth over time as viewed by a human observer.

Identifying shot changes via an automated system is problematic—methods known in the art suffer from two primary defects: (1) false-positive shot change detections (i.e., low precision), as when a flashbulb temporarily lights a stadium for a single frame or field of video, and (2) false-negatives or "missed" shot change detections (i.e., low recall), as when a director cuts from a first camera to another camera pointing to the same scene and object as the first camera, but from a slightly different angle. Other prior art systems have been proven reliable but are complex in that they require very expensive and extensive computation and concomitant hardware. As a result, such systems are not economically feasible for real-time applications.

Several prior art methods for detecting shot changes and their limitations have been well-documented and evaluated in an article by Smeaton, A. F., Over, P., and Doherty, A. R., titled "*Video shot boundary detection: Seven years of TRECVid activity*," Comput. Vis. Image Underst. 114, 4 (April 2010), 411-418 (hereinafter "Smeaton et al."). The nomenclature and taxonomy of Smeaton et al. are incorporated herein by reference in their entirety and shall be used in the remainder of the description.

Existing shot change detection methods include employing a continuity measure, such as changes in overall color values from image-to-image. Continuity measures may include statistical measurements, such as the mean luminosity of images, or multichannel histogram-based methods. Alone, such continuity measures typically result in false shot change detections (positive and negative). Other methods build upon the concept of continuity by incorporating motion vector data from compressed video data. However, such methods rely on the accuracy and robustness of encoded motion vectors. These motion vectors are not calculated and encoded for the purpose of shot change detection. Motion vectors are typically used to encode a residual prediction signal, where robustness and accuracy is not of primary concern. Unfortunately, methods that employ motion vectors as a primary feature for detecting a shot change encounter frequent false positives and negatives as well.

Other methods employ Bayesian statistical formulations to estimate a likelihood value for detecting shot changes; however, Bayesian statistical formulations are complex and are not applicable to real-time or near-real-time applications.

Yet other methods utilize some variation of a feature-vector approach calculated on all, or certain parts of, incoming images; however, such approaches require some heuristics that work well for certain classes of video (e.g., tennis matches), but not others (e.g., episodic TV dramas), and as a result, require some human intervention in order to ensure accuracy and, thus, are not suitable for automated shot change detection.

Further, many exiting shot change detection methods cannot positively identify shot changes when the shot boundary spans two scenes with similar luminance, color, scene content characteristics, or other pathological cases. Additionally, most of the methods of the prior art rely on simple heuristic thresholds and therefore are unreliable when confronted with unusual video sequences, or boundary cases. Further, these methods are all "hard-wired" in the sense that the robustness of shot change detection with respect to recall and precision are not readily interchangeable, nor selectable.

Accordingly, what would be desirable, but has not yet been provided, is a system and method for real-time or near-real-time automatic, unattended detection of shot changes within an image sequence, with a minimum of false positives and false negatives. Such a system and method would allow an external system to reliably choose to what degree recall, precision, or both, are of primary concern in the external system requiring shot change detection.

Tunable precision and/or recall is of importance to real-time, or near-real-time combined systems that may need to perform motion-compensated de-interlacing as an early step, and motion-compensated frame rate conversion as a later step, without requiring independent, expensive shot change detection systems, each tuned for particular precision and recall requirements. While such a system is illustrative, it is by no means limiting. By way of example, a system performing the tasks of film pull-down cadence detection, and then motion-compensated de-noising, may have different requirements for precision and recall for each of these steps, but would be equally well served by certain embodiments of the present invention.

SUMMARY OF THE INVENTION

The above-described problems are addressed and a technical solution is achieved in the art by providing a computer implemented method for detecting a shot change in a video sequence, the method comprising the steps of: receiving the video sequence comprising at least one pair of frames; determining an image similarity metric based on the at least one pair of frames; determining a feature vector based on a second derivative of the image similarity metric; and detecting a shot change upon determining that the feature vector is external to a feature vector threshold. The image similarity metric comprises a combination of: a sum-of-square difference measure (SSDM) between optical-flow-compensated frames, an optical flow energy change difference measure (OFEDM) between optical flow fields, and a hue histogram energy change differences measure (HHEDM) from histograms of hue channel values. The SSDM may be constructed with at least one of sum-of-square-differences (SSD), normalized cross correlation, sum-of-absolute differences, and sum of hamming distances.

According to an embodiment of the present invention, to determine an SSDM, a per-pixel optical flow field is calculated between a current frame and a previous frame. The previous frame towards is motion compensated toward the current frame with the calculated current optical flow field to produce a motion compensated image. A mean of a plurality of sum-of-square color differences is calculated between each pixel of the motion compensated frame and the current frame to arrive at the SSDM.

According to an embodiment of the present invention, to determine an OFEDM, a first optical flow field between a current frame and a previous frame and a second optical flow field between the previous frame and a previous third frame are calculated. The first optical flow field and the second optical flow field are converted to polar coordinates. The converted optical flow field is compared to the second converted optical flow field with respect to a direction and a magnitude of each pixel to arrive at a similarity scalar value for each pixel. The mean value of each of the similarity scalar values is calculated as the OFEDM.

According to an embodiment of the present invention, to determine an HHEDM, a current frame and a previous frame are converted to a hue-saturation-intensity color space. A histogram of hue channel values is calculated for the current frame and for the previous frame. The hue histogram of the current frame is compared to the hue histogram of the previous frame by means of a histogram intersection function to determine a single scalar value representing the HHEDM.

According to an embodiment of the present invention, at least one of the SSDM, OFEDM, and HHEDM may be a Laplacian second derivative. At least one of the SSDM, OFEDM, and HHEDM may be a backward-looking second derivative. A backward-looking second derivative may employ a two frame delay.

According to an embodiment of the present invention, the feature vector is external to a feature vector threshold further comprises when a surface formed by the feature vector is not subtended within a surface volume formed by a feature vector threshold surface. The feature vector threshold surface may be based on precision and recall, which may be further based on parametric relations between precision and recall chosen by a user to fit a system application.

BRIEF DESCRIPTION OF THE DRAWINGS

The present invention will be more readily understood from the detailed description of exemplary embodiments presented below considered in conjunction with the attached drawings in which like reference numerals refer to similar elements and in which:

FIGS. 5A and 5B are examples of two adjacent frames in a video sequence where the camera is zooming out;

FIGS. 5C and 5D show the direction field and magnitude field of the optical flow between the frames in FIGS. 5B and 5A, respectively;

It is to be understood that the attached drawings are for purposes of illustrating the concepts of the invention and may not be to scale.

DETAILED DESCRIPTION OF THE INVENTION

Embodiments of the present invention employ an exemplary system and method for reliably detecting shot changes that permits an external system or user to specify sensitivity to precision and recall. As a result, the computational and processing expense of performing shot change detection may be shared across multiple systems, with each system utilizing embodiments of the present invention without incurring massive additional computational costs, in spite of potentially computationally expensive precision and recall requirements. The net result for an external system, given a tunable sensitivity to precision and recall, is singular positive or negative indication of shot change recognition.

The term "computer" or "computer platform" is intended to include any data processing device, such as a desktop computer, a laptop computer, a mainframe computer, a server, a handheld device, a digital signal processor (DSP), an embedded processor (an example of which is described in connection with FIG. 1 hereinbelow), or any other device able to process data. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), video over packet-switched networks (TCP/IP, e.g., the Internet), satellite (microwave, MPEG transport stream or IP), direct broadcast satellite, analog cable transmission systems (RF), digital video transmission systems (ATSC, HD-SDI, HDMI, DVI, VGA), etc.

Figure 1:
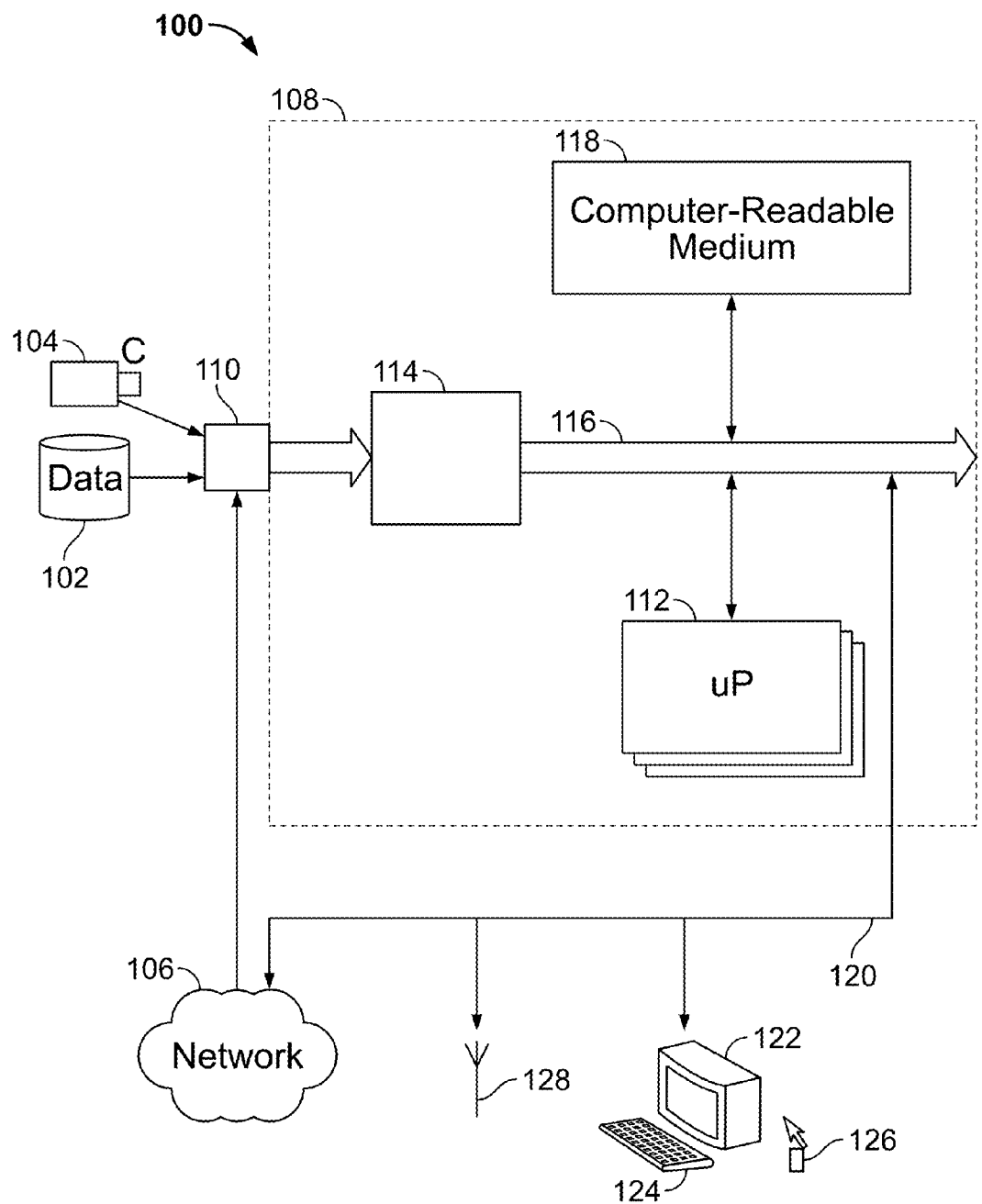
FIG. 1 is a hardware block diagram of an exemplary digital processing system for detecting shot changes, according to an embodiment of the present invention.

FIG. 1 depicts a block diagram of an exemplary computer implemented image processing system for detecting shot changes 100, according to an embodiment of the present invention. The system 100 may comprise any suitable video reception and/or transmission device. Suitable video transmission devices may comprise, for example, cameras with embedded transmission functions, camera transceiver systems, a video encoding appliance, a video statistical multiplexing appliance (statmux), computers with video capture cards, computers with attached cameras media servers that are spooling/streaming video files, PCs that are spooling/streaming video files, etc. Suitable video reception devices may comprise, for example, PCs, tablets, mobile phones, PDAs, video decoding appliances, video demultiplexing appliances, televisions, television distribution Devices (e.g., AppleTV™), television set-top boxes, and DVRs.

By way of a non-limiting example, the system 100 receives digitized video or still images from one or more data storage systems 102, and/or one or more image capturing devices 104 (e.g., one or more still or video cameras, shape cameras, LIDAR or IR photogrammetry-generated range data. Optionally, the digitized video or still images may be received from a network 106, such as the Internet. According to an embodiment of the present invention, the system 100 includes a computing platform 108, and may optionally include a digital video capture system 110. The digital video capturing system 110 processes streams of digital video, or converts analog video to digital video, to a form which can be processed by the computing platform 108. The digital video capturing system 110 may be stand-alone hardware, or cards such as Firewire cards which can plug-in directly to the computing platform 108. According to an embodiment of the present invention, the image capturing devices 104 may interface with the video capturing system 110/computing platform 108 over a heterogeneous data link, such as a radio link (e.g., between a satellite and a ground station) and digital data link (e.g., Ethernet, between the ground station and the computing platform 108). The computing platform 108 may include a personal computer or work-station (e.g., a Pentium-M 1.8 GHz PC-104 or higher) comprising one or more processors 112 which includes a bus system 122 which is fed by video data streams 116 via the one or more processors 112 or directly to a computer-readable medium 118. Alternatively, the computing platform 108 may be implemented as or part of an integrated circuit, such as a graphics processing unit (GPU) or digital signal processor (DSP) implemented in an FPGA or ASIC.

The computer readable medium 118 may also be used for storing the instructions of the system 100 to be executed by the one or more processors 112, including an optional operating system, such as the Windows or the Linux operating system. The computer readable medium 116 may further be used for the storing and retrieval of processed video of the present invention in one or more databases. The computer readable medium 118 may include a combination of volatile memory, such as RAM memory, and non-volatile memory, such as flash memory, optical disk(s), and/or hard disk(s). Portions of a processed video data stream 120 may be stored temporarily in the computer readable medium 118 for later output to a monitor 122. The monitor 122 may display processed video data stream/still images. The monitor 122 may be equipped with a keyboard 124 and a mouse 126 for selecting objects of interest by an analyst or viewer. Optionally, the portions the processed video data stream 122 may be stored temporarily in the computer readable medium 118 for later output to the network 106, such as the Internet, or to a satellite system via a transmitter 128.

Figure 2:
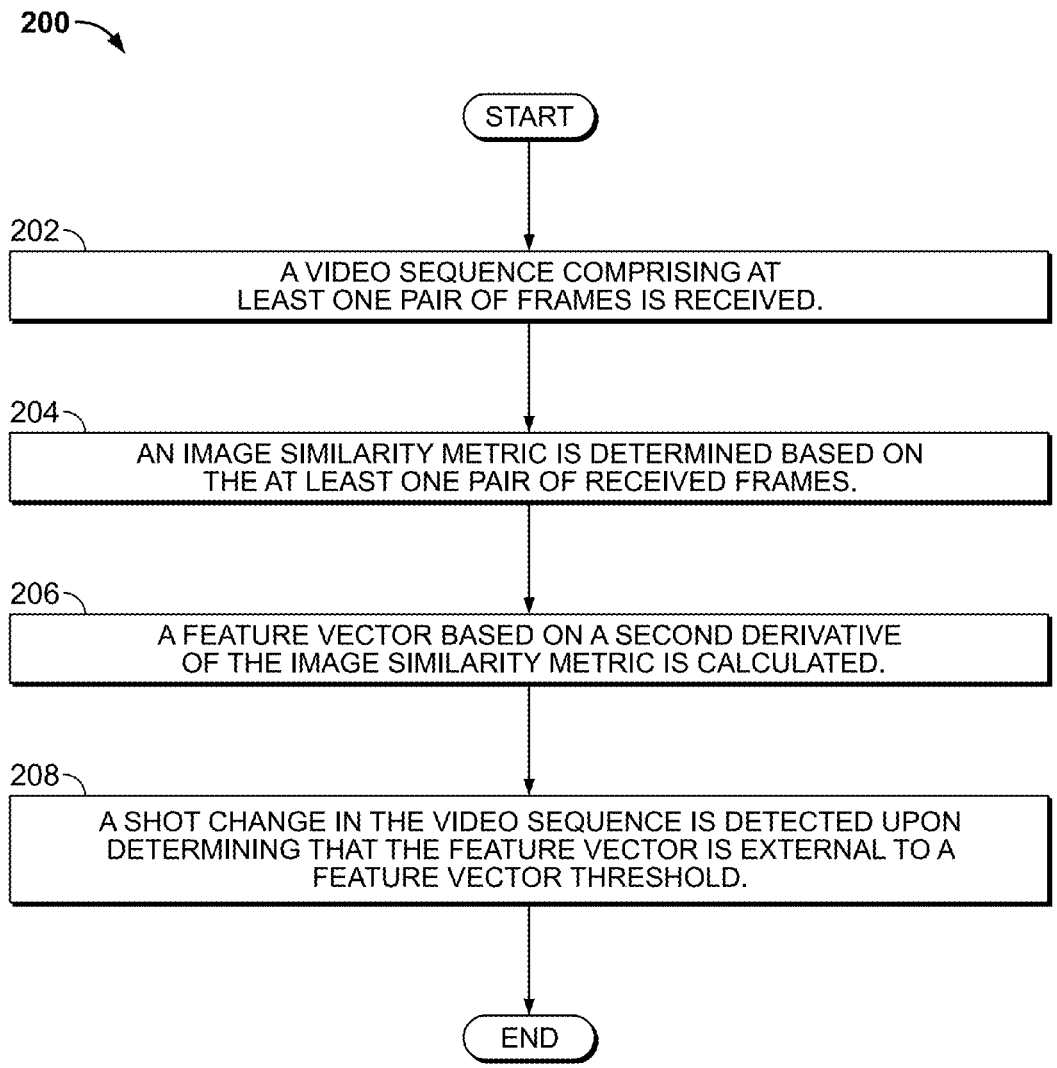
FIG. 2 is a high level a process flow diagram illustrating exemplary steps for detecting shot changes in a video sequence, according to an embodiment of the present invention.

FIG. 2 is a high level a process flow diagram 200 illustrating exemplary steps for detecting shot changes in a video sequence, according to an embodiment of the present invention. Referring now to FIGS. 1 and 2, in step 202, a video sequence comprising at least one pair of frames is received by the one or more processors 112 from the one or more image capturing devices 104. In step 204, one or more image similarity metrics is determined by the one or more processors 112 based on the at least one pair of received frames. As used herein an "image similarity metric" is a direct or calculated measure of changes in certain characteristics or features of the pixels in a pair of consecutive frames. The specific types of image similarity metric(s) employed in certain embodiments of the present invention are a sum-of-square difference measure (SSDM) between optical-flow-compensated frames, an optical flow energy change difference measure (OFEDM) between optical flow fields, and a hue histogram energy change differences measure (HHEDM) from histograms of hue channel values, all of which are to be described hereinbelow in greater detail. The sum-of-square difference measure (SSDM) may be constructed with sum-of-square-differences (SSD) in a preferred embodiment, or it may be constructed with normalized cross correlation, sum-of-absolute differences, or sum of hamming distances. All of these represent various ways to measure the similarity of one image to another. In step 206, a feature vector based on a second derivative of the image similarity metric may be calculated. Rapid changes between the aforementioned difference measures in two consecutive frames may indicate a change of scenes, i.e., a shot change. A person skilled in the art would appreciate that rapid changes in one or more metrics may be indicated by means of the second derivative of the image similarity metric(s) employed. These second derivative values, based on features of pairs of frames, may be collected into vectors of values, i.e., feature vectors. In step 208, a shot change in the video sequence may be detected upon determining that the feature vector is external to a feature vector threshold. A feature vector, comprising a set of values, forms a vector that may be expressed as an n-dimensional surface that forms an n+1-dimensional volume with the axes of a coordinate system, e.g., Cartesian or polar coordinates. A shot change may be detected or declared when an n-dimensional surface formed by a calculated feature vector lies outside of or "external" to this volume. The volume may be predetermined by the predetermined choice of values of a vector of thresholds, or, as described hereinbelow, in a preferred embodiment, the thresholds may be based on a user-selected tradeoff between precision and recall.

Figure 3A:
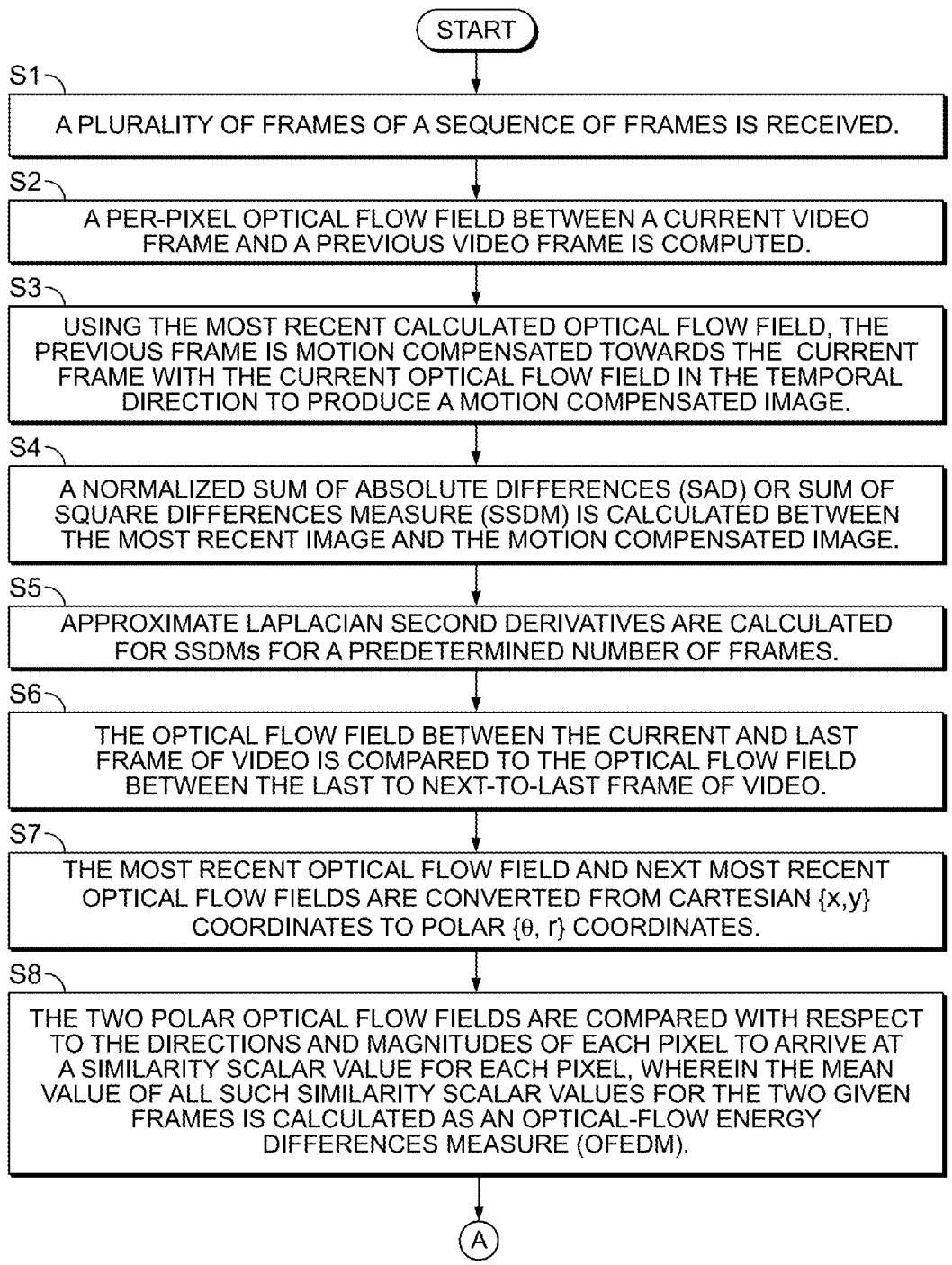
FIGS. 3A-3C are block diagrams illustrating exemplary steps of a method for detecting shot changes, according to an embodiment of the present invention.
Figure 3B:
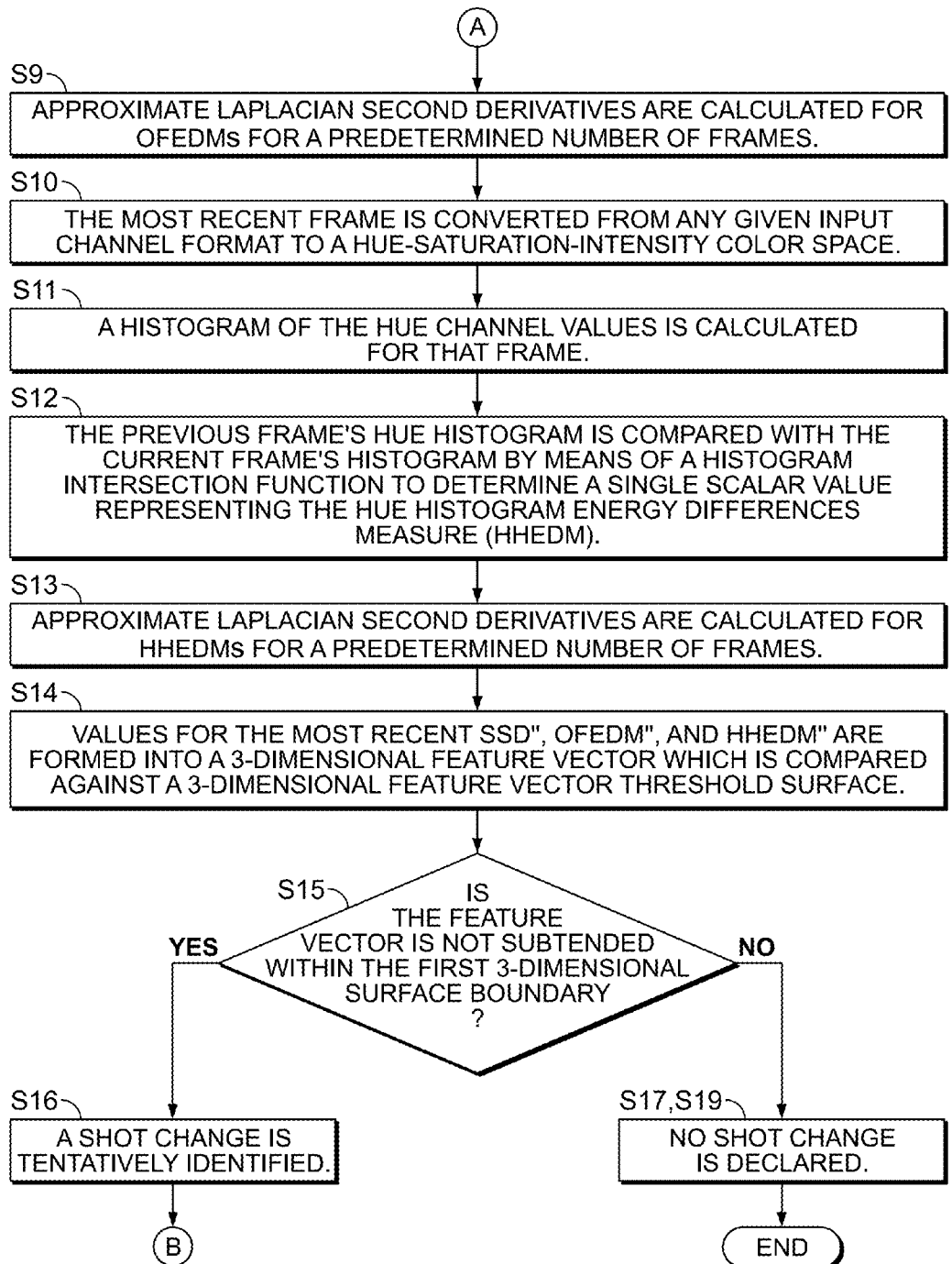
Figure 3C:
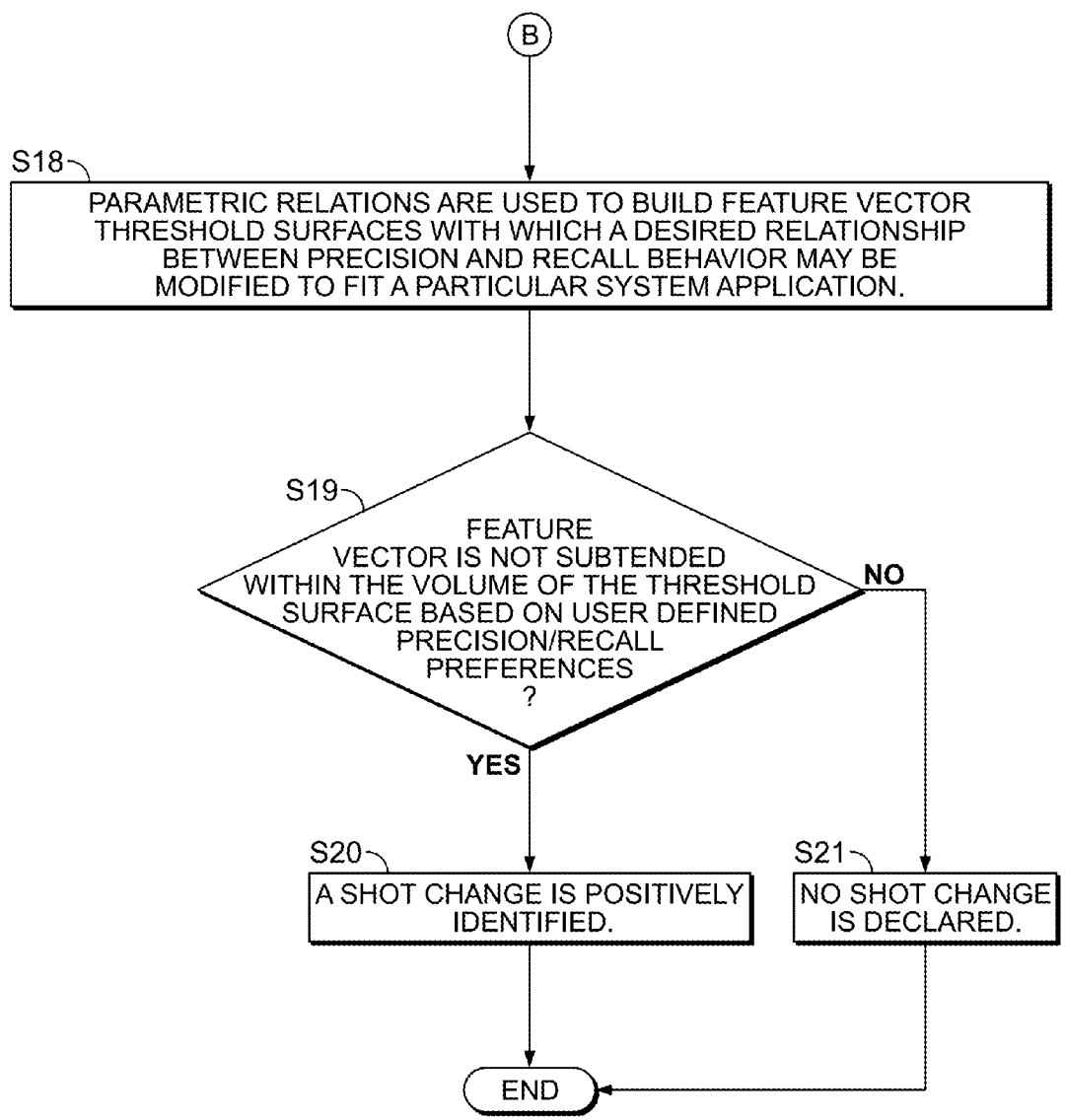
Figure 4A:
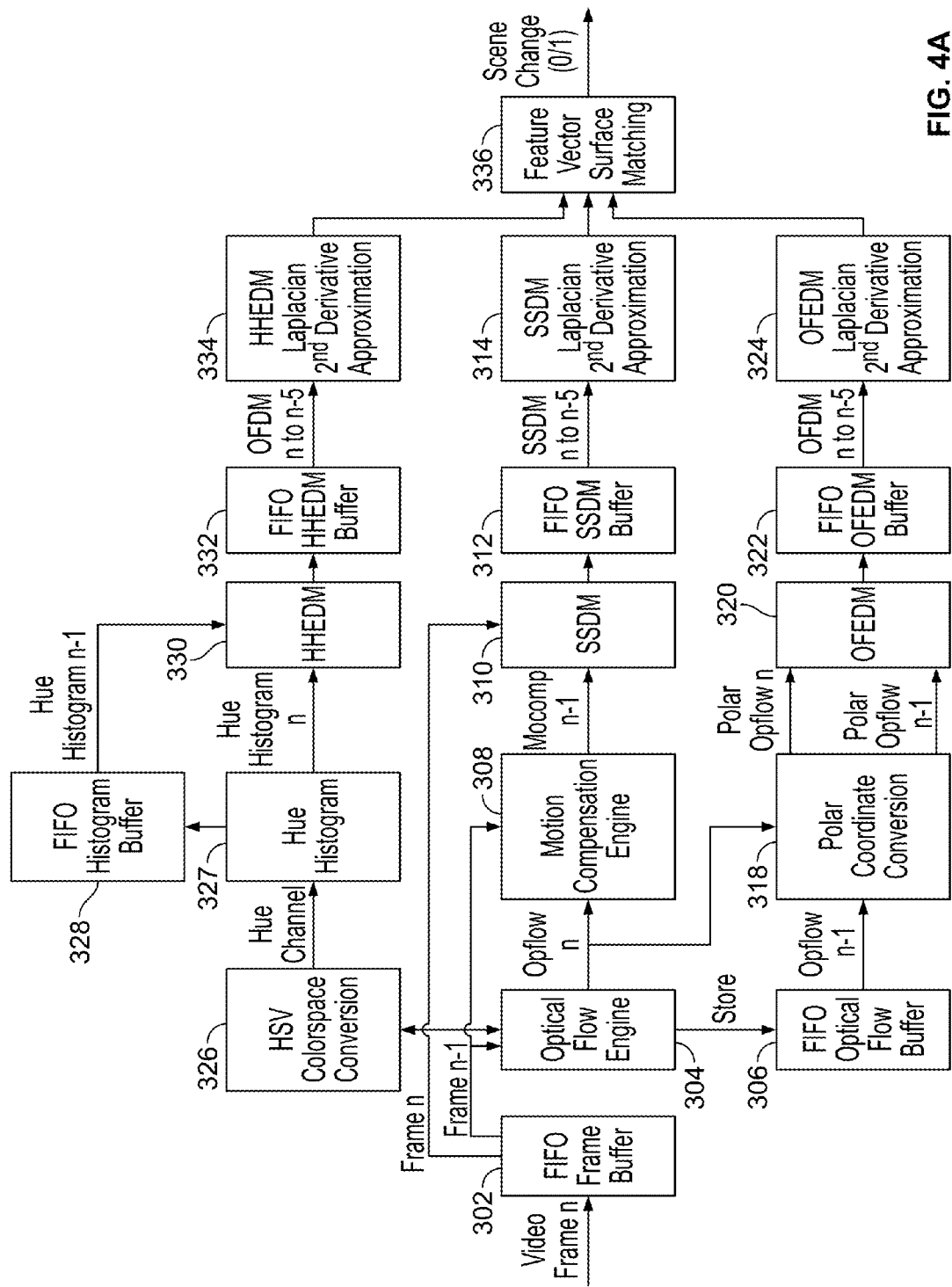
FIG. 4A is a block diagram of the modules that execute the method illustrated in FIGS. 3A-3C, according to an embodiment of the present invention.
Figure 4B:
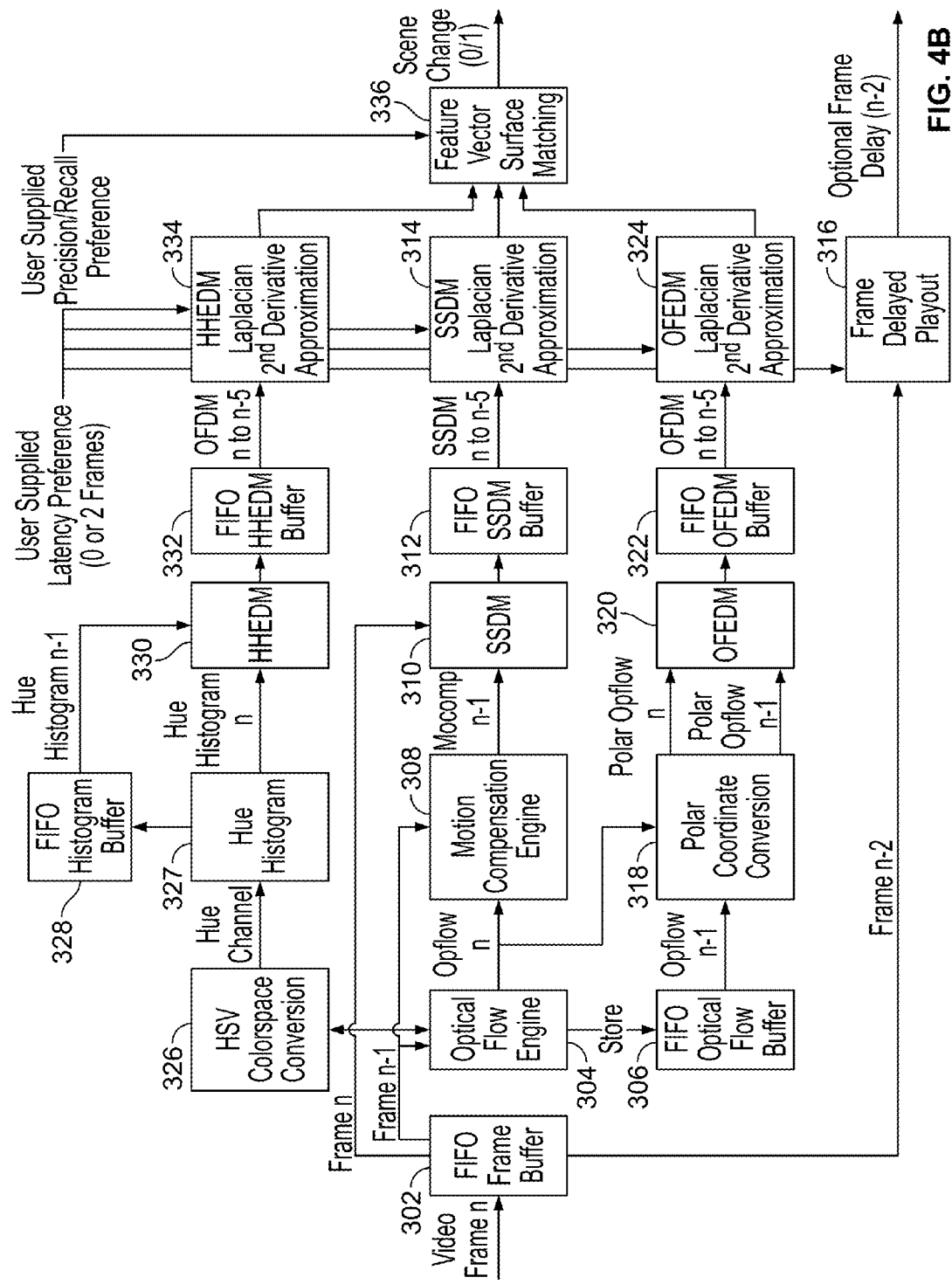
FIG. 4B is similar to the block diagram of FIG. 4A showing an additional module for delaying output frames, and for permitting a user to supply precision/recall preferences, according to an embodiment of the present invention.

FIGS. 3A-3C form a process flow block diagram illustrating exemplary steps for detecting shot changes in a sequence of frames as described above for FIG. 2 in greater detail, according to an embodiment of the present invention. FIG. 3A is a block diagram of the modules that execute the method illustrated in FIGS. 3A-3C, according to an embodiment of the present invention. FIG. 4B is block diagram similar to FIG. 4A showing an additional module for delaying output frames, and for permitting a user to supply precision/recall preferences to be described hereinbelow.

Referring now to FIGS. 1 and 2A-4B, in step S1, a plurality of frames is received and stored by the system 100 in a first-in-first-out (FIFO) frame buffer 302. It is assumed that inbound frames have been digitized and have been transformed to a suitable representation such as RGB or YUV color space. This FIFO frame buffer 302 is employed in several subsequent steps. FIGS. 5A and 5B show an example of two contiguous video frames of a sequence wherein a camera is zooming out.

In step S2, an optical flow engine 304 computes a per-pixel optical flow field between a current frame and a previous frame. The calculated optical flow field is stored in a FIFO optical flow buffer 306. Each pixel is assigned a motion vector comprising an x and y displacement with sub-pixel magnitude accuracy. According to an embodiment of the present invention, any suitable optical flow engine may be used. In a preferred embodiment, an optical flow engine employing a per-pixel optical flow calculation method is preferred, such as that taught in co-pending U.S. patent application Ser. No. 12/555,472 filed Sep. 8, 2009 and entitled "System and Method for Determination of Optical Flow" (hereinafter, the '472 application), which is incorporated herein by reference in its entirety.

Figure 6:
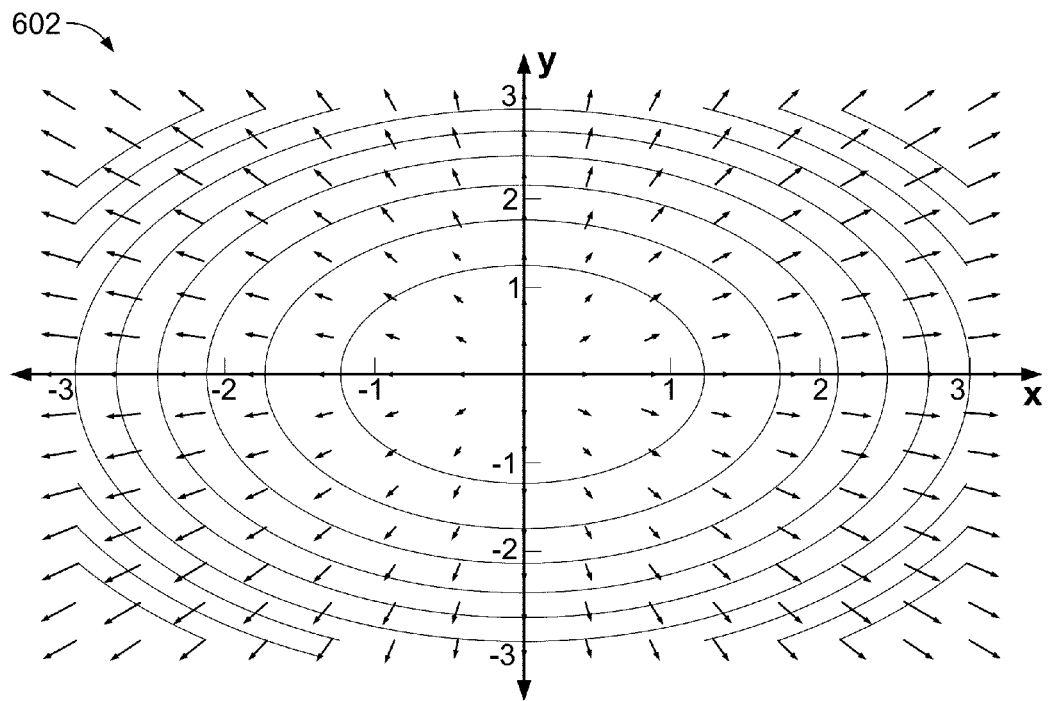
FIG. 6 shows a coarse detail of an overall vector field calculated by an optical flow for the frames of FIGS. 5B and 5A, respectively.
Figure 7A:
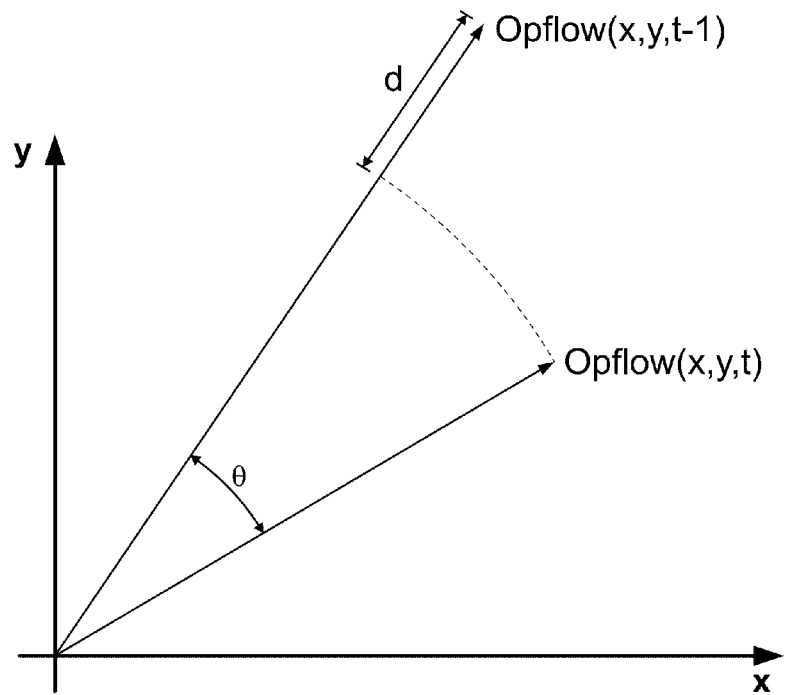
FIG. 7A is a vector diagram showing the relation of polar-coordinate compared optical flow vectors and geometric representation of the magnitude differences used to generate a scalar optical flow energy differences measure (OFEDM)
Figure 7B:
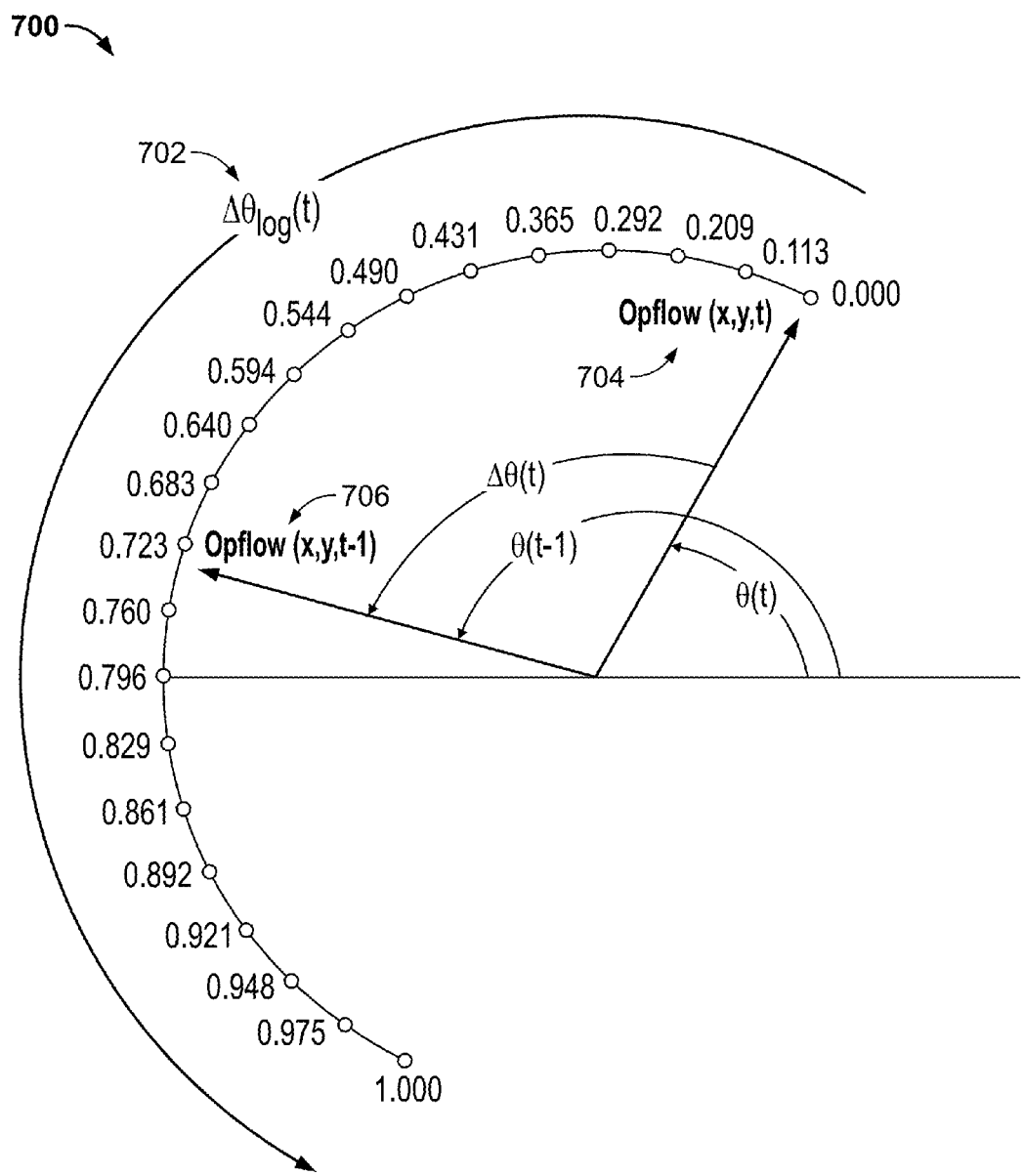
FIG. 7B shows a geometric representation of the log θ difference measure between compared optical flow vectors used to generate a scalar OFEDM.

The accuracy of the detection of a shot change relies to a large extent on the accuracy of calculations performed by the optical flow engine—namely, a forward motion compensated frame and an energy measure of the optical flow. FIGS. 5C and 45D show the direction field and magnitude field of the optical flow between the frames in FIGS. 5B and 5A, respectively. FIG. 6 shows a coarse detail of an overall vector field calculated by the optical flow engine 304 in step S2 for the frames of FIGS. 5B and 5A, respectively.

In step S3, using the most recent optical flow field in the FIFO optical flow buffer 306, a motion compensation engine 308 motion compensates the previous frame towards the current frame to produce a motion compensated image. There are many suitable motion compensation methods in the prior art, but in a preferred embodiment, a motion compensation method may be employed that accounts for object and pixel background reveals or "disocclusions". As used herein, reveals or disocclusions refer to foreground objects in motion that, from frame-to-frame, have "revealed" previously unseen background information.

These areas (hereinafter, "disocclusions") present problems for motion estimation systems in that there are no real, ground-truth forward motion vectors for these revealed background areas.

According to an embodiment of the present invention, at least one image similarity metric may be determined based on the plurality of frames. More particularly, in step S4, in a preferred embodiment, a sum of square differences measure (SSDM) 310 is calculated between the most recent image from the FIFO frame buffer 302 and the motion compensated image. The SSDM 310 may, in turn, be constructed with sum-of-square-differences (SSD) in a preferred embodiment, or it may be constructed with normalized cross correlation, sum-of-absolute differences, or sum of hamming distances. In another preferred embodiment, the SSDM 310 may be calculated as the sum-of-square color differences between each pixel of the motion compensated frame and the current frame. This value is pushed into a FIFO SSDM buffer 312.

The sum-of-squares difference measure (SSDM) calculation is shown in Eq. 1:

$$SSDM(t) = \frac{\sum_{x=0, y=0}^{x<width, h<height} [MoComp(x, y, t-1) - Frame(x, y, t)]}{xy} \quad (1)$$

In step S5, an approximate Laplacian second derivative is calculated for all values of the FIFO SSDM buffer 312 and stored in a SSDM Lapacian $2^{nd}$ Derivative Approximation buffer 314. More particularly, if the optical flow engine 304 encounters difficulty converging to accurate motion vectors, the value of SSDM(t) will rise. Also, if there is a shot change event, the value of SSDM(t) will also rise and then fall rapidly. To detect shot change events in circumstances where no frame delay is tolerable, a backward-looking $2^{nd}$ derivative approximation is used as in Eq. 2a:

$$SSDM''(t) = \max\left\{0, SSDM(t) - \frac{[SSDM(t-1) + SSDM(t-2)]}{2}\right\} \quad (2a)$$

In order to detect rapid rises (or local maxima), a more accurate second derivative approximation may be performed with a two-frame delay as in Eq. 2b and depicted as the frame delay playout block 316 of FIG. 4B:

$$SSDM''(t) = \frac{3SSDM(t) - [SSDM(t-1) + SSDM(t+1)]}{2} - \frac{[SSDM(t-2) + SSDM(t+2)]}{4} \quad (2b)$$

Figure 8A:
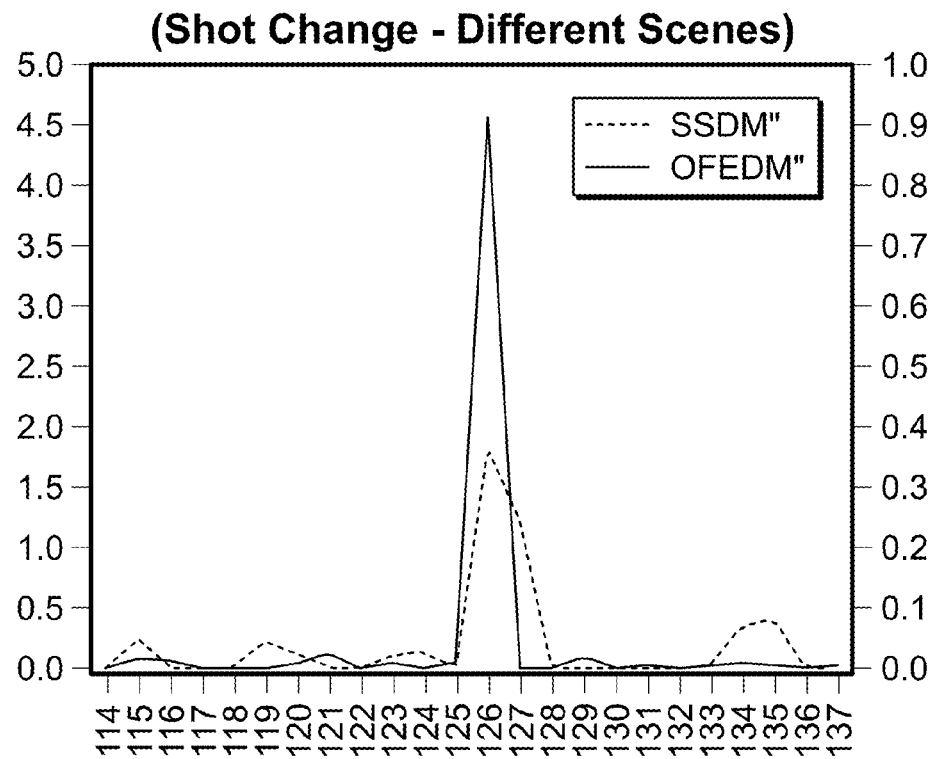
FIGS. 8A and 8B are plots of a sum of square differences measure (SSDM"), an optical flow energy differences measure (OFEDM"), and a hue histogram energy differences measure (HHEDM"), respectively, for an exemplary shot change between frames with very different scene content.
Figure 8B:
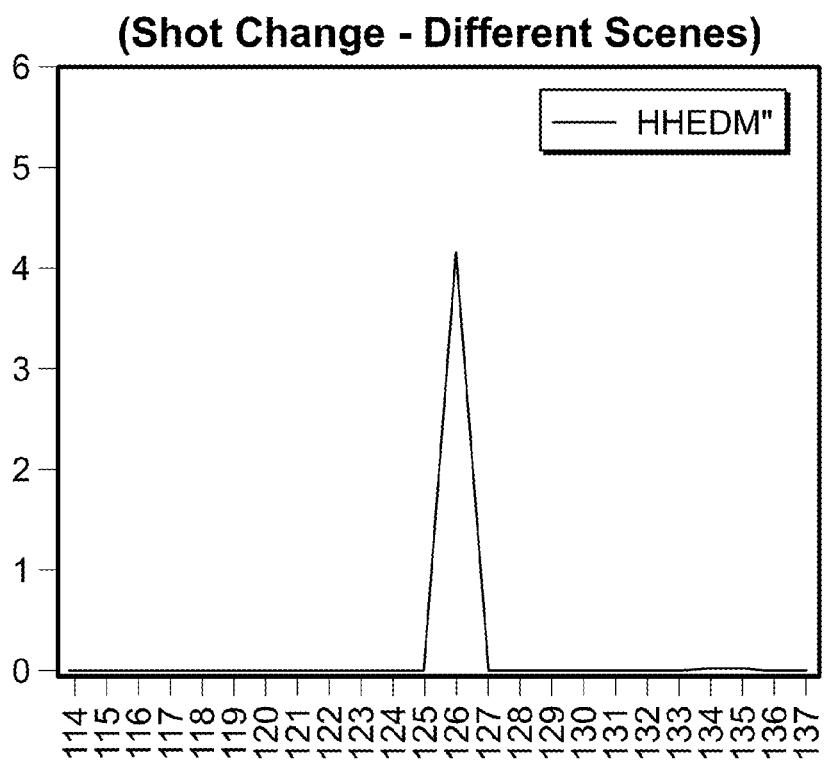
Figure 9A:
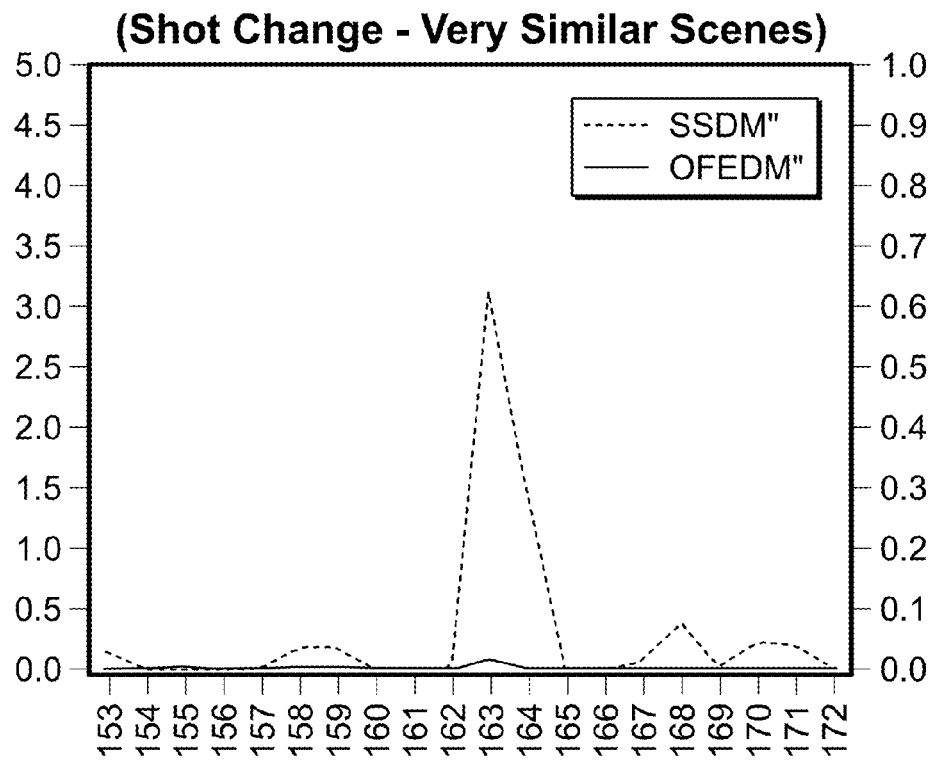
FIGS. 9A and 9B are plots of SSDM", OFEDM", and HHEDM", respectively, for an exemplary shot change between frames with very similar scene content.
Figure 9B:
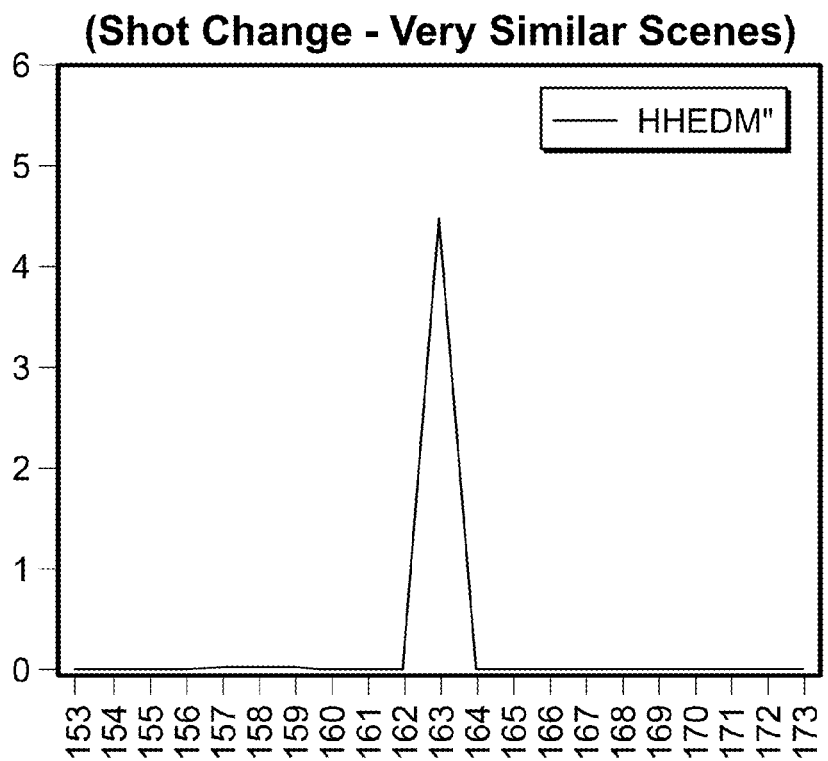
Figure 10A:
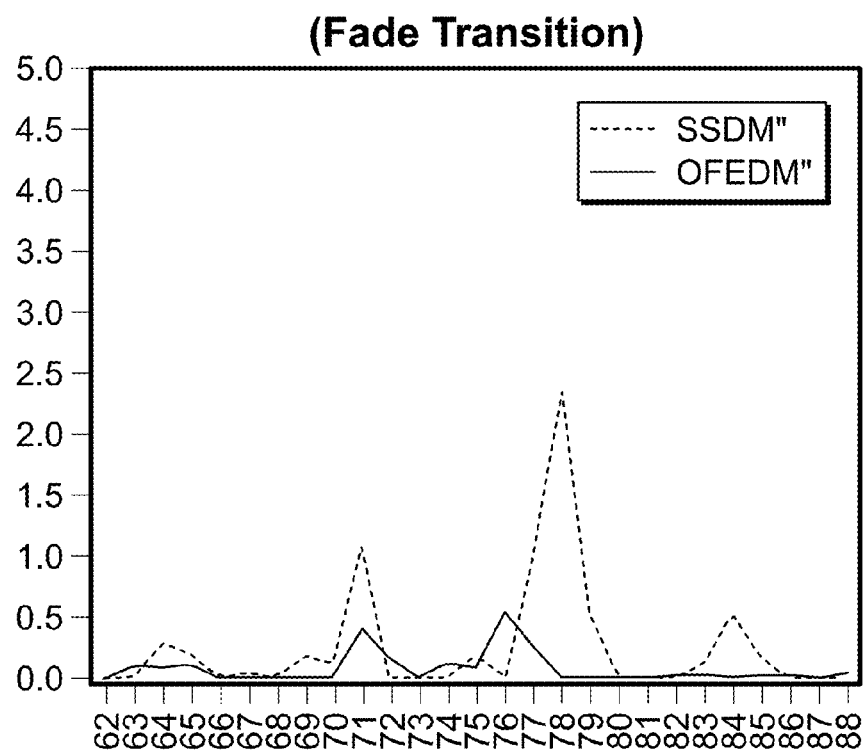
FIGS. 10A and 10B are plots of SSDM", OFEDM", and HHEDM", respectively, for an exemplary shot change resulting from a fade transition.
Figure 10B:
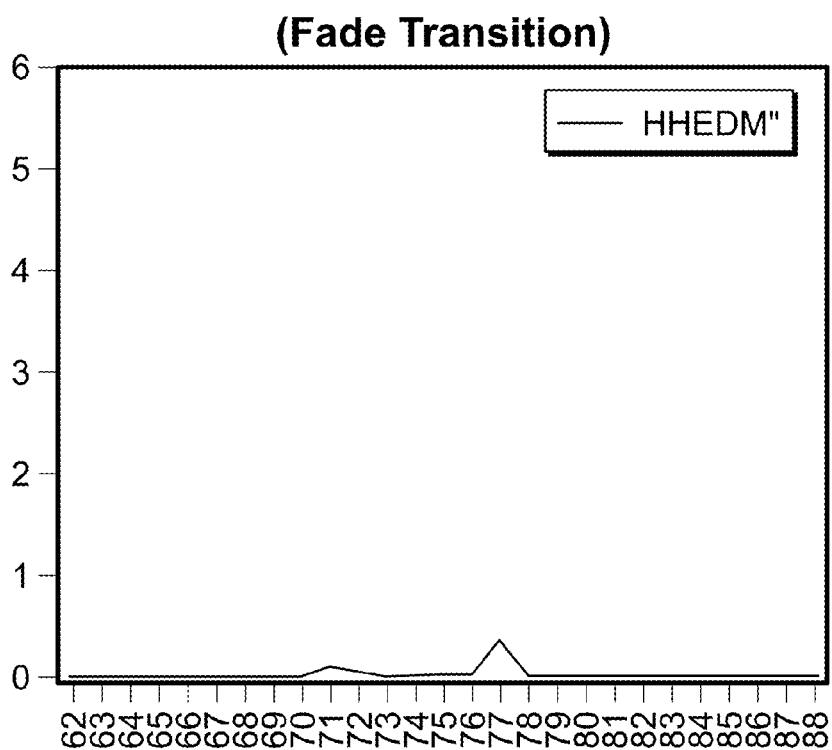
Figure 11A:
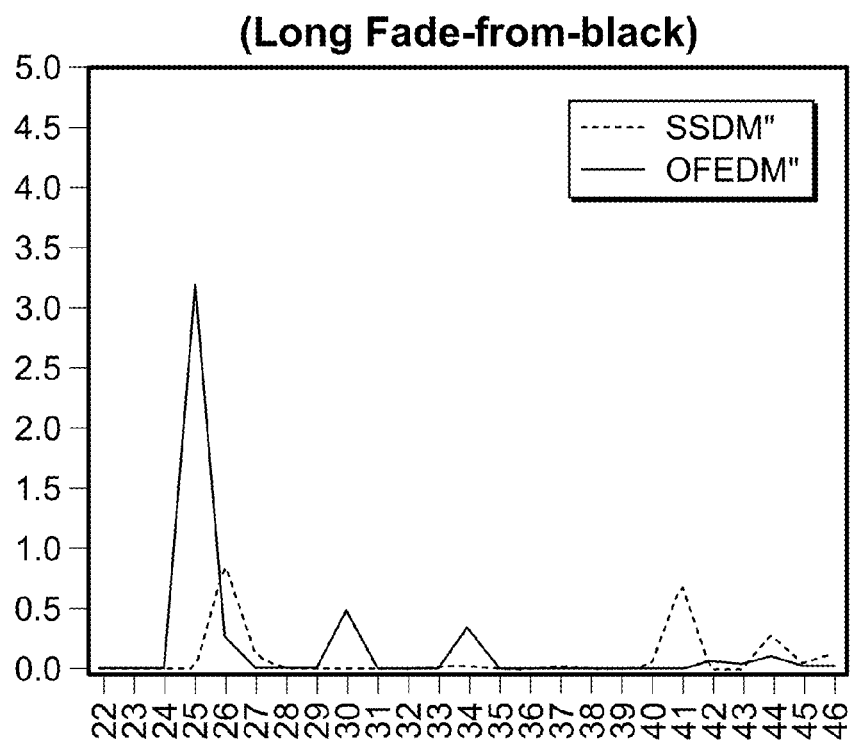
FIGS. 11A and 11B are plots of SSDM", OFEDM", and HHEDM", respectively, for an exemplary shot change resulting from a long fade-from-black transition.
Figure 11B:
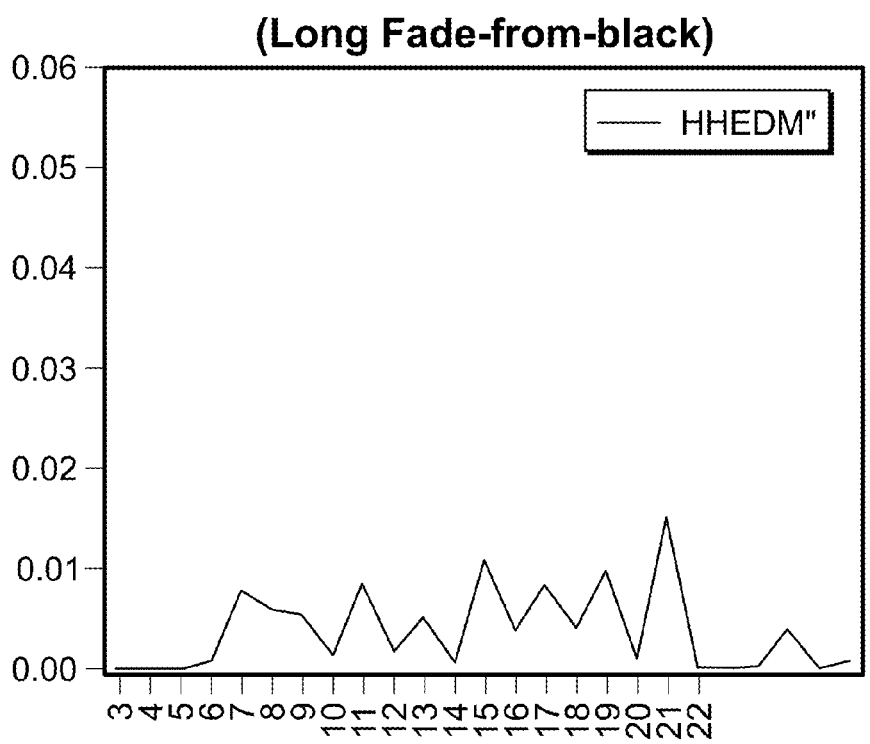

FIG. 8A shows a plot of SSDM"(t) against time for a well-defined shot boundary between two frames containing very different colors, objects, and image characteristics. SSDM"(t) may be used as a somewhat reliable indicator by itself for well-behaved boundaries. FIG. 9A shows a plot of SSDM"(t) against time for a well-defined shot boundary, except that the two shots both have a large amount of background of the same color and similar saturation, with the foreground objects being bright white. This is a challenging case and, as a result, SSDM"(t) by itself may not produce a significantly differentiable signal to reliably signal a shot change.

In step S6, the optical flow field between the current and last frame of video is compared to the optical flow field between the last to next-to-last frame of video by the optical flow engine 304 and stored in the FIFO optical flow buffer 306. In a preferred embodiment, each optical flow field comprises a buffer containing fixed-point or floating-point values representing an offset, in pixels, of the last frame necessary to motion compensate each pixel to match the current frame while observing and compensating for disocclusion artifacts.

In step S7, the most recent optical flow field and next most recent optical flow fields from the FIFO optical flow buffer 306 are converted from Cartesian {x,y} coordinates to polar {θ, r} coordinates in a polar coordinate conversion module 318. More particularly, an optical flow field may be conceptualized as a vector field in two dimensions, expressed in Cartesian coordinates. Certain embodiments of the present invention exploit two features of the two optical flow fields calculated above. As a field of two-vectors for every pixel, each pixel's motion may be characterized by a direction and magnitude. In such circumstances, a polar coordinate transform is utilized, wherein each Cartesian optical flow vector for each pixel is transformed into a direction and magnitude for each of the current frame and the previous frame, as shown in Eq. 3:

$$\theta_1(x, y, t) = \frac{a\tan2(Opflow(x, y, t)_x, Opflow(x, y, t)_y) + \pi}{2\pi} \quad (3)$$

$$\theta_2(x, y, t) = \frac{a\tan2(Opflow(x, y, t-1)_x, Opflow(x, y, t-1)_y) + \pi}{2\pi}$$

As a measure of directional differences between optical flow vectors from frame-to-frame, motion vectors that point opposite to each other (180 degrees opposed) are considered most different, as illustrated in Eq. 4. Two such vectors are illustrated in FIGS. 6A and 6B, with differences in detection (θ) and magnitude (distance, or d).

$$\Delta\theta(x,y,t) = \min[abs(\theta_2-\theta_1), abs(\theta_2-1.0-\theta_1), abs(\theta_2+1.0-\theta_1)] \quad (4)$$

To numerically emphasize the optical flow vectors' angular differences, the difference of angles is transformed to a logarithmic scale. If optical flow vectors for a particular spatial location change direction by a predetermined amount, their difference is calculated on a logarithmic weighting scale as in Eq. 5:

$$\Delta\theta_{log}(x,y,t) = 1.442695 \log(1.0+2.0\times\Delta\theta) \quad (5)$$

The magnitude differences (d) of the respective optical flow vectors for each spatial location are transformed to a logarithmic scale. This emphasizes large differences in "d". FIG. 6B illustrates such a relationship, with possible vector direction log magnitudes demonstrated. Values for these are as calculated in Eq. 6:

$$D(x, y, z) = \log\left\{1.9 + 4.0 \times \max\left[\frac{\sqrt{Opflow(x, y, t)_x^2 + Opflow(x, y, t)_y^2}}{\sqrt{Opflow(x, y, t-1)_x^2 + Opflow(x, y, t-1)_y^2}}\right]\right\} \quad (6)$$

In step S8, the resulting two polar optical flow fields are compared with respect to the directions and magnitudes of each pixel to arrive at a similarity scalar value for each pixel.

The mean value of all such similarity scalar values for the two given frames is calculated as an optical-flow energy differences measure (OFEDM) 320. More particularly, the OFEDM 320 for each pixel location is calculated by multiplying the scaled magnitude differences by the scaled angle difference, thereby ensuring greater weighting of large changes in magnitude or direction contribute to the per-pixel OFEDM value as in Eq. 7:

$$OFEDM(x,y,t)=D(x,y,t)\times \Delta\theta_{log}(x,y,t) \quad (7)$$

The sum of the per-pixel OFEDM values are divided by the width times height of the video frame to arrive at OFEDM(t) for the current video frame. A person skilled in the art will appreciate that a good optical flow system most often shows that consecutive frames are related optically. Abrupt shot changes are characterized in that consecutive frames are not correlated optically. Per-frame optical flow energy changes may be used to detect singularities and therefore shot changes by taking the mean of per-pixel OFEDM as in Eq. 8:

$$OFEDM(t) = \frac{\sum_{1}^{x} OFEDM(x, y, t)}{xy} \quad (8)$$

In step S9, an approximate Laplacian second derivative is calculated for all values of the FIFO OFEDM buffer 322 and stored in an OFEDM Lapacian $2^{nd}$ Derivative Approximation buffer 324. More particularly, as with SSDM, a $2^{nd}$ derivative approximation may be employed to detect rapid change events with OFEDM values. Again, the user may indicate whether accuracy or zero frame-delay is more valuable as depicted in the frame delay payout block 316 of FIG. 4B. Eq. 9a shows a backward-looking $2^{nd}$ derivative approximation used for the zero-frame-delay case:

$$OFEDM''(t) = \max\left\{0, OFEDM(t) - \frac{[OFEDM(t-1) + OFEDM(t-2)]}{2}\right\} \quad (9a)$$

For the two-frame delay case, Eq. 9b is used:

$$OFEDM''(t) = \frac{3OFEDM(t) - [OFEDM(t-1) + OFEDM(t+1)]}{2} - \frac{[OFEDM(t-2) + OFEDM(t+2)]}{4} \quad (9b)$$

FIG. 8A shows a plot of OFEDM" (t) against time for a well-defined shot boundary, wherein each of the two frames have a large amount of background of the same color and similar saturation, with the foreground objects being bright white. FIG. 9A shows a plot of OFEDM" (t) against time for a well-defined shot boundary between two shots containing very different colors, objects, and image characteristics. OFEDM"(t) may be employed as a reliable indicator by itself for well-behaved boundaries. By itself, localization of the shot change boundary may present an issue—but in concert with SSDM" (t), OFEDM"(t) may be used to reliably signal a shot change in a vast majority of cases.

Unfortunately, SSDM and OFEDM are entirely reliant on the robustness of the motion detection method employed. A person skilled in the art would appreciate that no optical flow engine is 100% reliable due to issues such as the well-known Aperture Problem and frame-to-frame object disocclusion. As used herein, the "Aperture Problem" occurs when a block matching method estimates a wrong motion vector due to lack of sufficient differences between blocks with no texture or edge differences along a gradient, which results in a motion vector at a local minimum instead of the global minimum. To ensure additional precision and recall characteristics for shot change detection, more refinement is necessary.

A well-known property of shot changes within video is that shape, skew, and modes of histograms may change by a large factor from one scene to the next and may form either a primary or contributory signal towards identification of shot changes. While shape, skew, and modes of histograms changes may provide a good visual indication of shot changes, posing such changes in a form readily and economically identified by an automatic system is challenging.

A person skilled in the art will appreciate that, while lighting, specular highlights, and shadows may drastically alter the luminance or intensity values for video from frame-to-frame, most objects do not change their intrinsic coloration. As a result, certain embodiments of the present invention employ color changes, rather than luminance or intensity changes, from image-to-image to measure large-scale statistical changes.

In step S10, the most recent image is converted from any given input channel format to a hue-saturation-intensity color space by an HSV colorspace conversion module 326. More particularly, the hue value of this conversion is used. This is because objects generally do not change color on their own, and even if ambient lighting coloration does change overall hue values in an image, Retinex theory provides a way to recognize and compensate for these changes. After Retinex correction is performed mathematically in RGB colorspace, Hue provides a good specular-invariant, shadow-invariant measure of scene differences. After compensation in an RGB colorspace, all pixels of the input images are converted to Hue values as per Eq. 10:

$$\begin{aligned} maxRGB &= \max(R, G, B) \\ minRGB &= \min(R, G, B) \\ chroma &= maxRGB - minRGB \\ Hue &= \begin{cases} NaN, & \text{if chroma} = 0 \\ \frac{(G-B)}{chroma} \bmod 6, & \text{if } maxRGB = R \\ \frac{(B-R)}{chroma} + 2, & \text{if } maxRGB = G \\ \frac{(R-G)}{chroma} + 4, & \text{if } maxRGB = B \end{cases} \end{aligned} \quad (10)$$

In step S11, a histogram of the hue channel values is calculated in histogram block 327 and stored in a one-index (ping-pong) buffer (i.e., the FIFO histogram buffer 328). Upon a second pass through this step, the FIFO histogram buffer 328 contains the last histogram calculation from the previous frame.

In Step S12, the previous frames' hue histogram is compared with the current frame's histogram. The current frame histogram and previous frame histogram are compared by means of an efficient histogram intersection function to determine a single scalar value representing the hue histogram energy differences measure (HHEDM) 330. This value is pushed into a FIFO HHEDM buffer 332.

More particularly, a windowed minimum local distance measure is employed according to Eq. 11:

$$HHEDM(t) = \frac{\sum_{n=1}^{size} \left( \min_{0 \le n \le size} [hist(n, t) - hist(n, t-1)] \right)}{size} \quad (11)$$

This distance measure has the benefit of positively identifying histograms that have substantially different shapes, mean, skewness, and modes, while being implementable as a parallel process—each outer operation is independent of the others and may be executed by a separate thread or processing pipeline.

As with SSDM, in step S13, an approximated second derivative is calculated for all values of the FIFO HHEDM buffer 332 and stored in a HHEDM $2^{nd}$ derivative approximation buffer 334 to help single out rapid change events with respect to HHEDM values. Again, the user can indicate whether accuracy or zero frame-delay is more valuable. Eq. 12a shows a backward-looking $2^{nd}$ derivative approximation used for the zero-frame-delay case:

$$HHEDM''(t) = \quad (12a)$$
$$\max\left\{0, HHEDM(t) - \frac{[HHEDM(t-1) + HHEDM(t-2)]}{2}\right\}$$

For the two-frame delay case, Eq. 12b is used:

$$HHEDM''(t) = \quad (12b)$$
$$\left\{\frac{3HHEDM(t) - [HHEDM(t-1) + HHEDM(t+1)]}{2}\right\} -$$
$$\left\{\frac{[HHEDM(t-2) + HHEDM(t+2)]}{4}\right\}$$

In step S14, values for the most recent SSD", OFEDM", and HHEDM" are formed into a 3-dimensional feature vector which is compared against a 3-dimensional feature vector threshold surface in a feature vector surface matching module 336. According to an embodiment of the present invention, a shot change is determined when the feature vector is external to a feature vector threshold. More particularly, in step S15, if the feature vector is not subtended within the 3-dimensional surface boundary, then in step S16, a shot change is tentatively identified, otherwise, in step S17, no shot change is declared.

One or more of SSDM", OFEDM", and HHEDM" may be employed to indicate a shot change. The simplest technique would be to compare each second derivative to a user-supplied pre-determined threshold, i.e., if SSDM" exceeded a certain heuristic threshold, OFEDM" exceeded a second threshold, and HHEDM" exceeded yet a third, a shot change is indicated.

Figure 12:
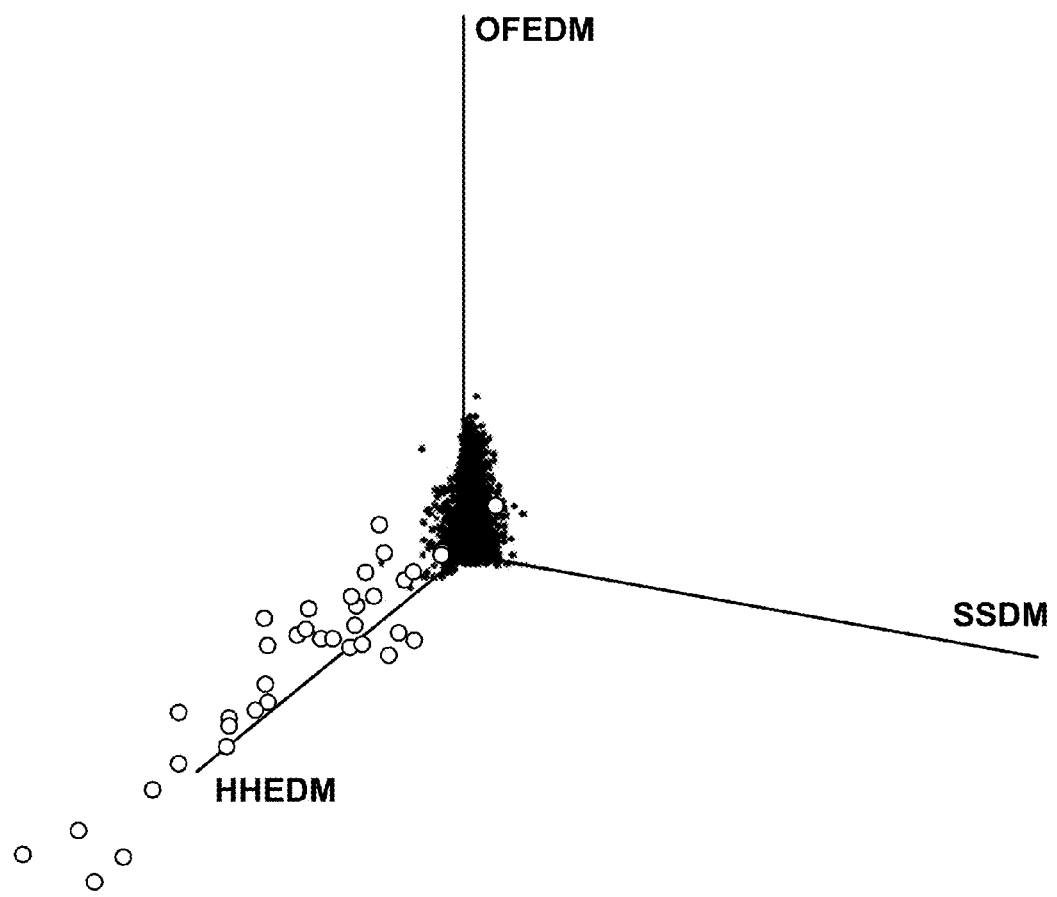
FIG. 12 shows a three-dimensional plot of SSDM"-OFEDM"-HHEDM" feature vectors, wherein manual indications of abrupt shot changes are marked with large circles.

FIG. 12 illustrates that a more complex relationship between SSDM", OFEDM", and HHEDM" emerges that can be used to indicate a shot change. If the three indicators are treated as a feature vector over $\Re^3$, it may be observed that non-scene change frames cluster not only towards the origin, but towards the three respective axes. By treating the feature vector as a geometric distance measure over which an arbitrary evaluation surface is applied, any number of complex relationships between SSDM", OFEDM", and HHEDM" may be employed to indicate a shot change.

Figure 13A:
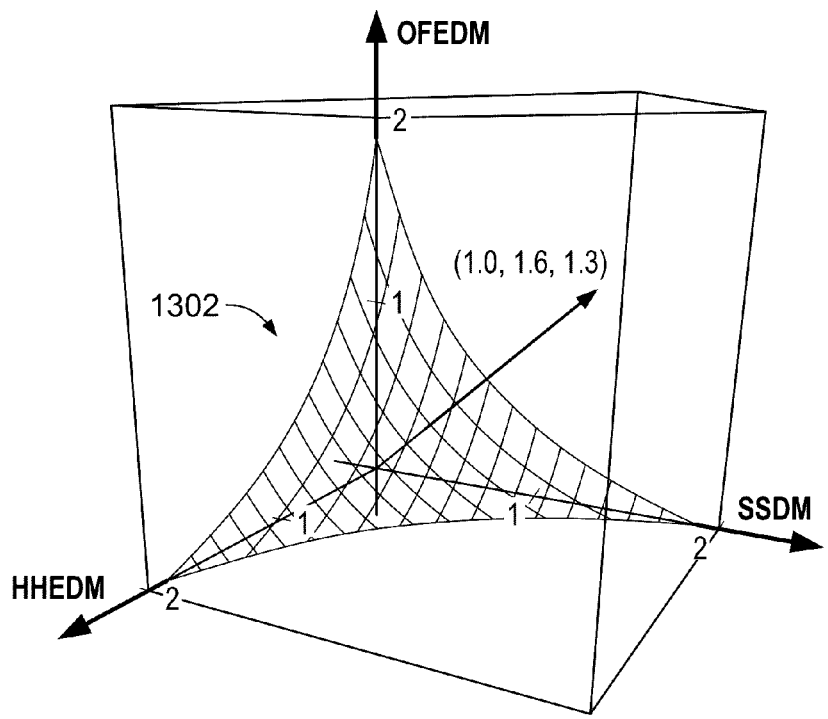
FIG. 13A-13D show three-dimensional plots of SSDM"-OFEDM"-HHEDM" threshold surfaces with a candidate feature vector.
Figure 13B:
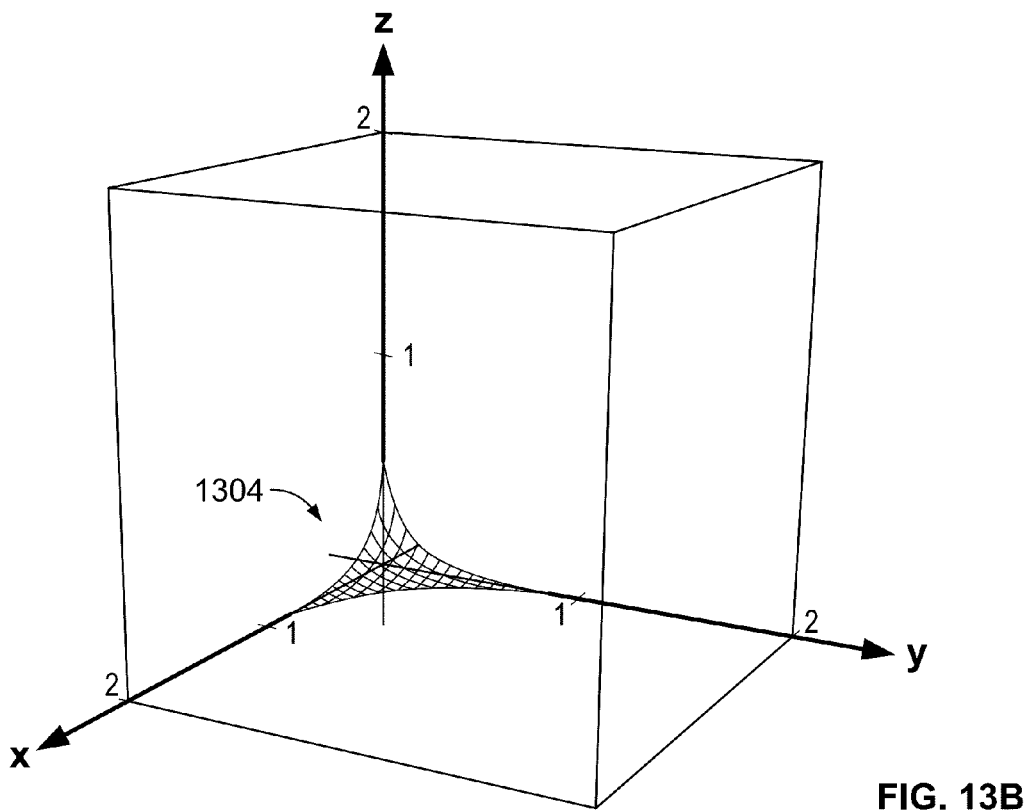
Figure 13C:
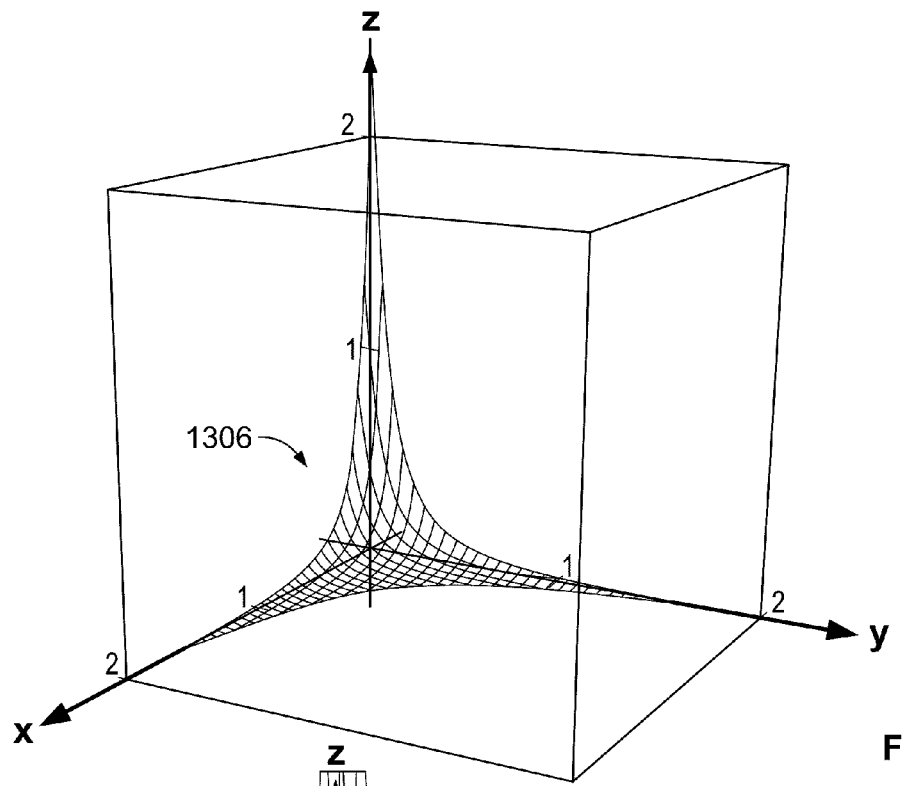
Figure 13D:
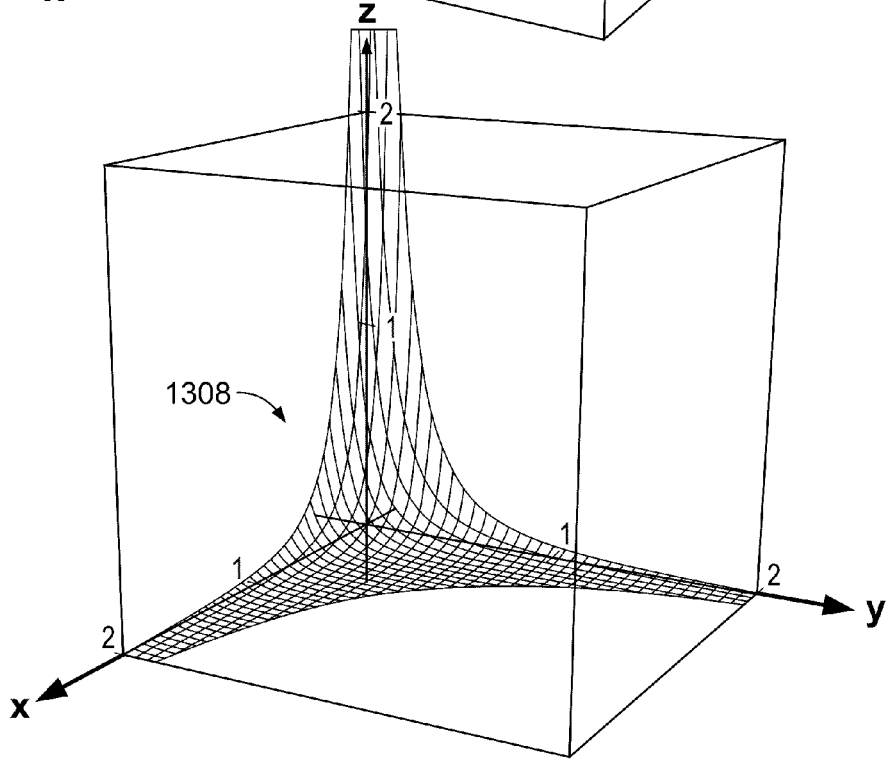

In a preferred embodiment, over the course of several million video frames of observation, an inverse hyperbolic surface emerged as a best-fit threshold. Further, certain parameters of this surface may permit a user to have a finely granular control over the precision and recall characteristics of shot change detection. FIG. 13A depicts such a surface mnemonically. An inverse hyperbolic surface along with a posited feature vector (SSDM", OFEDM", HHDM") is shown. If such a feature vector is not subtended within the volume of the threshold surface, a positive shot change event is considered to have occurred. FIG. 13B shows a feature vector threshold surface that may be used for motion-compensated de-interlacing, where precision is more important than recall. FIG. 13C shows a feature threshold surface where precision and recall are balanced against one another, as with motion-compensated de-noising systems. FIG. 13D shows a feature threshold surface where precision is considered secondary to recall, as with motion parallax extraction systems.

In step S18, parametric relations are used to build feature vector threshold surfaces with which a desired relationship between precision and recall behavior may be modified to fit a particular system application, as indicated by user supplied precision/recall preferences 338 in FIG. 4B. If, in step S19, the feature vector is not subtended within the volume of the threshold surface based on user defined precision/recall preferences, then in step S20, a positive shot change event is considered to have occurred, otherwise, in step S21, a shot change is not considered to have occurred.

More particularly, the surfaces described in FIGS. 13A-13D may be expressed with a single user input nominating the preferred weighting of balance between precision and recall, where the user input ranges from 0 to 1.0 where 0.0 indicates heavy weighting of precision, 1.0 indicates heavy weighting of recall, and 0.5 indicates an even balance of the two. The surface is defined parametrically in Eq. 13, where U is the user input specifying precision/recall preference. Given the present values of SSDM" and HHEDM", the single threshold that OFEDM" needs to satisfy is provided by Eq. 13:

$$OFEDM''(t)_{threshold} = \log(1.002 + 0.018U) + \quad (13)$$
$$0.001\left[\left(\frac{1}{SSDM''(t) + 0.21}\right)^{3.0-U}\left(\frac{1}{HHEDM''(t) + 0.21}\right)^{3.0-U}\right]$$

Subsequently, positive shot change indication is evaluated with a single threshold as in Eq 14:

$$SceneChange(t) = \begin{cases} 0, & OFEDM''(t) < OFEDM''(t)_{threshold} \\ 1, & \text{otherwise.} \end{cases} \quad (14)$$

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method, comprising:
   receiving, by a processor, a plurality of images;
   determining, by the processor, an image similarity metric based on at least one pair of images of the plurality of images, wherein the similarity metric comprises determining an optical flow energy change difference measure (OFEDM) between optical flow fields comprising:
      calculating a first optical flow field between a current image and a previous frame and a second optical flow field between the previous image and a previous third image;
      comparing the first optical flow field to the second optical flow field by multiplying a scaled angle difference by a scaled magnitude difference for each pixel to arrive at a similarity scalar value for each pixel; and
      calculating a mean value of each of the similarity scalar values as the per pixel OFEDM; and
   detecting, by the processor, a shot change in the plurality of image upon the mean of the per pixel OFEDM exceeding a user-supplied threshold.

2. The method of claim 1, wherein the image similarity metric further comprises:
   a sum-of-square difference measure (SSDM) between optical-flow-compensated images and
   a hue histogram energy change differences measure (HHEDM) from histograms of hue channel values.

3. The method of claim 2, wherein the SSDM is constructed with at least one of sum-of-square-differences (SSD), normalized cross correlation, sum-of-absolute differences, and sum of hamming distances.

4. The method of claim 2, wherein the SSDM is determined by:
   calculating a per-pixel optical flow field between a current image and a previous image;
   motion compensating the previous image towards the current image with the calculated optical flow field to produce a motion compensated image; and
   calculating a mean of a plurality of sum-of-square color differences between each pixel of the motion compensated image and the current image to arrive at the SSDM.

5. The method of claim 2, wherein the HHEDM is determined by:
   converting a current image and a previous image to a hue-saturation-intensity color space;
   calculating a histogram of hue channel values for the current image and for the previous image; and
   comparing the hue histogram of the current image to the hue histogram of the previous image by means of a histogram intersection function to determine a single scalar value representing the HHEDM.

6. The method of claim 1, further comprising determining a feature vector based on a second derivative of the image similarity metric.

7. The method of claim 6, wherein the second derivative is a Laplacian second derivative.

8. The method of claim 6, wherein the second derivative is a backward-looking second derivative.

9. The method of claim 8, wherein the backward-looking second derivative employs a two frame delay.

10. The method of claim 6, wherein a surface formed by the feature vector is not subtended within a surface volume formed by a feature vector threshold surface.

11. The method of claim 10, wherein the feature vector threshold surface is based on precision and recall.

12. The method of claim 11, wherein the feature vector threshold surface based on precision and recall is based on parametric relations between precision and recall chosen by a user to fit a system application.

13. An apparatus, comprising:
   a memory;
   a processor, coupled to the memory, the processor to:
      receive a plurality of images;
      determine an image similarity metric based on at least one pair of images of the plurality of images, wherein the similarity metric comprises determining an optical flow energy change difference measure (OFEDM) between optical flow fields comprising the processor to:
         calculate a first optical flow field between a current image and a previous frame and a second optical flow field between the previous image and a previous third image;
         compare the first optical flow field to the second optical flow field by multiplying a scaled angle difference by a scaled magnitude difference for each pixel to arrive at a similarity scalar value for each pixel; and
         calculate a mean value of each of the similarity scalar values as the per pixel OFEDM; and
      detect a shot change in the plurality of images upon mean of the per pixel OFEDM exceeding a user-supplied threshold.

14. The system of claim 13, wherein the image similarity metric further comprises:
   a sum-of-square difference measure (SSDM) between optical-flow-compensated images and
   a hue histogram energy change differences measure (HHEDM) from histograms of hue channel values.

15. The system of claim 14, wherein the SSDM is constructed with at least one of sum-of-square-differences (SSD), normalized cross correlation, sum-of-absolute differences, or sum of hamming distances.

16. The system of claim 14, wherein the SSDM is determined by the processor to:
   calculate a per-pixel optical flow field between a current image and a previous image;
   motion compensate the previous image towards the current image with the calculated optical flow field to produce a motion compensated image; and
   calculate a mean of a plurality of sum-of-square color differences between each pixel of the motion compensated image and the current image to arrive at the SSDM.

17. The system of claim 14, wherein the HHEDM is determined by the processor to:
   convert a current image and a previous image to a hue-saturation-intensity color space;
   calculate a histogram of hue channel values for the current image and for the previous image; and
   compare the hue histogram of the current image to the hue histogram of the previous image by means of a histogram intersection function to determine a single scalar value representing the HHEDM.

18. The system of claim 14, wherein the processor is further to determine a feature vector based on a second derivative of the image similarity metric.

19. The system of claim 18, wherein a surface formed by the feature vector is not subtended within a surface volume formed by a feature vector threshold surface.

20. The system of 18, further comprising a plurality of first-in first-out (FIFO) frame buffers for storing the plurality of images and the at least one of the SSDM, OFEDM, and HHEDM.

21. A non-transitory computer-readable storage medium including instructions that, when executed by a processor, cause the processor to:
 receive a plurality of images;
  determine an image similarity metric based on at least one pair of images of the plurality of images, wherein the similarity metric comprises determining an optical flow energy change difference measure (OFEDM) between optical flow fields comprising the processor to:
   calculate a first optical flow field between a current image and a previous image and a second optical flow field between the previous image and a previous image frame;
   compare the first optical flow field to the second optical flow field by multiplying a scaled angle difference by a scaled magnitude difference for each pixel to arrive at a similarity scalar value for each pixel; and
   calculate a mean value of each of the similarity scalar values as the per pixel OFEDM; and
 detect a shot change in the plurality of images upon the mean of the per pixel OFEDM exceeding a user-supplied threshold.

22. The non-transitory computer-readable storage medium of claim 19, wherein the image similarity metric further comprises a combination of:
 a sum-of-square difference measure (SSDM) between optical-flow-compensated images and
 a hue histogram energy change differences measure (HHEDM) from histograms of hue channel values.

23. The non-transitory computer-readable storage medium of claim 22, wherein the SSDM is constructed with at least one of sum-of-square-differences (SSD), normalized cross correlation, sum-of-absolute differences, or sum of hamming distances.

24. The non-transitory computer-readable storage medium of claim 22, wherein the SSDM is determined by the processor to:
 calculate a per-pixel optical flow field between a current image and a previous image;
 motion compensate the previous image towards the current image with the calculated optical flow field to produce a motion compensated image; and
 calculate a mean of a plurality of sum-of-square color differences between each pixel of the motion compensated image and the current image to arrive at the SSDM.

25. The non-transitory computer-readable storage medium of claim 22, wherein the HHEDM is determined by the processor to:
 convert a current image and a previous image to a hue-saturation-intensity color space;
 calculate a histogram of hue channel values for the current image and for the previous image; and
 compare the hue histogram of the current image to the hue histogram of the previous image by means of a histogram intersection function to determine a single scalar value representing the HHEDM.

26. The non-transitory computer-readable storage medium of claim 21, further comprising the processor to determine a feature vector based on a second derivative of the image similarity metric.

27. The non-transitory computer-readable storage medium of claim 26, wherein a surface formed by the feature vector is not subtended within a surface volume formed by a feature vector threshold surface.

* * * * *